US012082519B2

(12) United States Patent
Montag et al.

(10) Patent No.: US 12,082,519 B2
(45) Date of Patent: *Sep. 10, 2024

(54) SINGLE PARTICULATE METERING SYSTEM WITH VARIABLE RATE CONTROLS

(71) Applicant: Montag Investments, LLC, Emmetsburg, IA (US)

(72) Inventors: Roger A. Montag, Malcolm, NE (US); Isaac Mogler, West Bend, IA (US); Jason Fehr, Ottosen, IA (US)

(73) Assignee: Montag Investments, LLC, Emmetsburg, IA (US)

( * ) Notice: Subject to any disclaimer, the term of this patent is extended or adjusted under 35 U.S.C. 154(b) by 245 days.

This patent is subject to a terminal disclaimer.

(21) Appl. No.: 17/689,355

(22) Filed: Mar. 8, 2022

(65) Prior Publication Data

US 2022/0183221 A1    Jun. 16, 2022

Related U.S. Application Data

(60) Continuation of application No. 16/504,888, filed on Jul. 8, 2019, now Pat. No. 11,291,156, which is a
(Continued)

(51) Int. Cl.
*A01C 15/04* (2006.01)
*A01C 7/08* (2006.01)
(Continued)

(52) U.S. Cl.
CPC .............. *A01C 15/04* (2013.01); *A01C 7/081* (2013.01); *A01C 7/082* (2013.01); *A01C 7/102* (2013.01);
(Continued)

(58) Field of Classification Search
CPC ......... A01C 15/04; A01C 7/081; A01C 7/082; A01C 7/102; A01C 7/16; A01C 15/003;
(Continued)

(56) References Cited

U.S. PATENT DOCUMENTS

| 318,377 A | 5/1885 | Latcha |
| 557,058 A | 3/1896 | Dodge |

(Continued)

FOREIGN PATENT DOCUMENTS

| CN | 101828099 A | 9/2010 |
| CN | 202497837 U | 10/2012 |

(Continued)

OTHER PUBLICATIONS

Mogler, Indian Examination Report (Second), Application No. 201727029298, Dec. 22, 2022, 3 pages, 1 New Reference.
(Continued)

*Primary Examiner* — Christopher J. Novosad
(74) *Attorney, Agent, or Firm* — Goodhue, Coleman & Owens, P.C.

(57) ABSTRACT

A particulate metering system includes an air flow origin and a plurality of particulate accelerators. A single particulate source is in communication with the particulate accelerators. Each of a plurality of operated conveyances can be in operable communication with the single particulate source and one of the particulate accelerators. The system includes a confluence of the air flow and the particulate within the mixing area of each of the particulate accelerators. Each of a plurality of discharges can be associated with the particulate accelerators. The operated conveyances can operate at different rates. The system can include one or more gearboxes adapted to be inverted and controlled by a second drive system. The system and controls provide variable application rates of particulate across rows in a field.

20 Claims, 19 Drawing Sheets

Related U.S. Application Data division of application No. 15/627,052, filed on Jun. 19, 2017, now Pat. No. 10,368,480, which is a continuation of application No. 14/600,664, filed on Jan. 20, 2015, now Pat. No. 9,681,602.

(51) Int. Cl.

| | | |
|---|---|---|
| *A01C 7/10* | (2006.01) | |
| *A01C 7/16* | (2006.01) | |
| *A01C 15/00* | (2006.01) | |
| *A01C 15/12* | (2006.01) | |
| *A01C 15/16* | (2006.01) | |
| *A01C 19/02* | (2006.01) | |
| *F04D 25/08* | (2006.01) | |
| *G01F 13/00* | (2006.01) | |
| *G05D 7/00* | (2006.01) | |
| *G05D 7/06* | (2006.01) | |
| *G05D 11/13* | (2006.01) | |

(52) U.S. Cl.
CPC .............. *A01C 7/16* (2013.01); *A01C 15/003* (2013.01); *A01C 15/006* (2013.01); *A01C 15/12* (2013.01); *A01C 15/16* (2013.01); *A01C 19/02* (2013.01); *F04D 25/08* (2013.01); *G01F 13/005* (2013.01); *G05D 7/00* (2013.01); *G05D 7/0605* (2013.01); *G05D 11/132* (2013.01)

(58) Field of Classification Search
CPC ....... A01C 15/006; A01C 15/12; A01C 15/16; A01C 19/02; A01C 15/00; A01C 7/08; A01C 7/00; A01C 7/10; A01C 15/005; A01C 19/00; F04D 25/08; F04D 25/02; F04D 25/00; G01F 13/005; G01F 13/001; G01F 13/00; G05D 7/00; G05D 7/0605; G05D 11/132; G05D 7/06; G05D 11/131; G05D 11/13; G05D 11/02; G05D 11/00
See application file for complete search history.

(56) References Cited

U.S. PATENT DOCUMENTS

| | | |
|---|---|---|
| 771,118 A | 9/1904 | Bechtel et al. |
| 1,630,317 A | 5/1927 | Skonier |
| 1,786,969 A | 12/1930 | Der |
| 1,805,940 A | 5/1931 | Dolan |
| 1,992,090 A | 2/1935 | Paolo |
| 2,395,973 A | 3/1946 | Mcintosh |
| 2,452,898 A | 11/1948 | Bourdette |
| 2,793,914 A | 5/1957 | Gardeniers et al. |
| 2,865,260 A | 12/1958 | Lee |
| 2,959,869 A | 11/1960 | Ackerman |
| 3,314,734 A | 4/1967 | Lewis |
| 3,373,973 A | 3/1968 | Hans-Joachim |
| 3,386,773 A | 6/1968 | Ballard, Jr. |
| 3,568,937 A | 3/1971 | Grataloup |
| 3,596,805 A | 8/1971 | Farmery |
| 3,606,097 A | 9/1971 | Wall |
| 3,625,431 A | 12/1971 | Andersson |
| 3,708,208 A | 1/1973 | Fuss |
| 3,710,983 A | 1/1973 | Ricciardi |
| 3,893,515 A | 7/1975 | Sadler |
| 3,894,721 A | 7/1975 | Boenisch |
| 3,926,377 A | 12/1975 | Johnson |
| 4,008,855 A | 2/1977 | van der Lely |
| 4,020,991 A | 5/1977 | Dreyer |
| 4,087,079 A | 5/1978 | Kramer |
| 4,142,685 A | 3/1979 | Dreyer et al. |
| 4,296,695 A | 10/1981 | Quanbeck |
| 4,402,635 A | 9/1983 | Maruo |
| 4,413,934 A | 11/1983 | Kern |
| 4,422,810 A | 12/1983 | Boring |
| 4,432,675 A | 2/1984 | Machnee |
| 4,473,016 A | 9/1984 | Gust |
| 4,479,743 A | 10/1984 | Stahl |
| 4,495,968 A | 1/1985 | Kist |
| 4,529,104 A | 7/1985 | Tyler |
| 4,561,781 A | 12/1985 | Seymour |
| 4,562,968 A | 1/1986 | Widmer et al. |
| 4,569,486 A | 2/1986 | Balmer |
| 4,583,883 A | 4/1986 | Johanning |
| 4,793,744 A | 12/1988 | Montag |
| 4,801,210 A | 1/1989 | Gian |
| 4,834,004 A | 5/1989 | Butuk et al. |
| 4,900,157 A | 2/1990 | Stegemoeller et al. |
| 5,018,869 A | 5/1991 | Paul |
| 5,104,229 A | 4/1992 | Paul |
| 5,242,120 A | 9/1993 | Barber |
| 5,299,888 A | 4/1994 | Wysong et al. |
| 5,592,889 A | 1/1997 | Bourgault |
| 5,775,585 A | 7/1998 | Duello |
| 5,913,602 A | 6/1999 | Steele |
| 5,934,205 A | 8/1999 | Gordon et al. |
| 6,142,714 A | 11/2000 | Montag |
| 6,305,835 B1 | 10/2001 | Farrar et al. |
| 7,344,298 B2 | 3/2008 | Wilmer et al. |
| 7,854,066 B2 | 12/2010 | Wendte |
| 8,336,469 B2 | 12/2012 | Preheim et al. |
| 8,616,761 B2 | 12/2013 | McLaughlin et al. |
| 9,681,602 B2 | 6/2017 | Montag et al. |
| 9,781,878 B2 | 10/2017 | Montag |
| 10,364,840 B2 | 7/2019 | Kamiya |
| 10,368,480 B2 * | 8/2019 | Montag .................. A01C 7/082 |
| 11,291,156 B2 * | 4/2022 | Montag .................. A01C 19/02 |
| 2003/0161694 A1 | 8/2003 | Bauver et al. |
| 2005/0024988 A1 | 2/2005 | Hoff et al. |
| 2005/0235889 A1 | 10/2005 | Martin et al. |
| 2012/0186501 A1 | 7/2012 | Zarnescu et al. |
| 2012/0211508 A1 | 8/2012 | Barsi et al. |
| 2012/0230778 A1 | 9/2012 | Petit et al. |
| 2016/0207015 A1 | 7/2016 | Montag et al. |
| 2016/0207016 A1 | 7/2016 | Montag et al. |
| 2016/0207018 A1 | 7/2016 | Montag et al. |
| 2016/0207718 A1 | 7/2016 | Montag et al. |

FOREIGN PATENT DOCUMENTS

| | | |
|---|---|---|
| CN | 103349930 A | 10/2013 |
| CN | 104923097 A | 9/2015 |
| KR | 1020080086150 A | 9/2008 |

OTHER PUBLICATIONS

"International Application No. PCT/US2015/012021 International Search Report and Written Opinion", May 5, 2015, 18 pages.
"International Application No. PCT/US2015/012050 International Search Report and Written Opinion", May 5, 2015, 17 pages.
European Patent Office, "the Supplementary European search report and the European search opinion", Application No. 15879150.9-1011/3247191, 13 pages, Jan. 7, 2019.
Mogler, Indian Examination Report, Application No. 201727029298, Jun. 23, 2020, 7 pages, 1 New Reference.

* cited by examiner

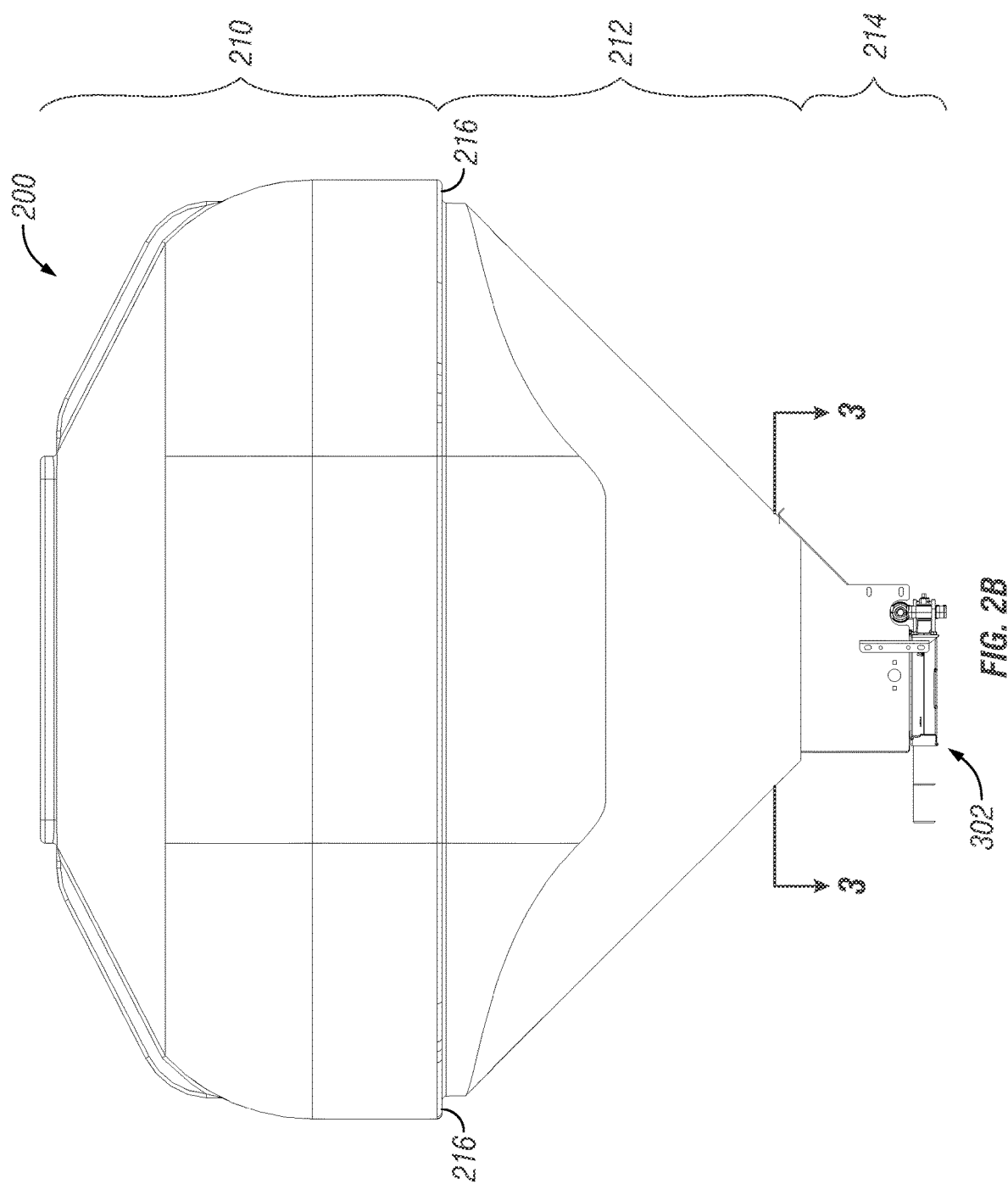

SINGLE PARTICULATE METERING SYSTEM WITH VARIABLE RATE CONTROLS

PRIORITY STATEMENT

This is a Continuation of U.S. application Ser. No. 16/504,888 filed on Jul. 8, 2019 which is a Divisional of U.S. application Ser. No. 15/627,052 filed on Jun. 19, 2017, now U.S. Pat. No. 10,368,480 issued Aug. 6, 2019 which is a Continuation of U.S. application Ser. No. 14/600,664 filed on Jan. 20, 2015, now U.S. Pat. No. 9,681,602 issued Jun. 20, 2017, all of which are titled Single Particulate Metering System with Variable Rate Controls, which are hereby incorporated by reference in their entirety.

BACKGROUND

I. Field of the Disclosure

A metering system for solid particulate is disclosed. More specifically, but not exclusively, a metering system with variable application rate controls for particulate matter, such as dry fertilizers, is disclosed.

II. Description of the Prior Art

Particulate metering systems use varied approaches to control the rate at which particulate is metered. In such instances where the particulate is fertilizer, there's a significant interest in controlling the application rate of the fertilizers, and specifically controlling the application rate across separate rows in a field. In other words, what is desired in at least one application is a dry fertilizer metering system which can adjust or vary the application rate on a row-by-row basis—one row receiving fertilizer(s) at a desired rate while another row receives fertilizer(s) at the same or another desired rate. In most instances of multi-row metering using pneumatics, the distance from the air source to the discharge point for the row unit farthest from the metering implement is greater than the distance from the air source to the discharge point of the row unit closest to the metering implement. Therefore, complications can arise generating enough airflow to meter particulate to all the row units while controlling the application rates. Still further, the particulate traveling through an airflow path of the metering implement can experience wall friction, requiring greater upstream air pressure and increased power consumption to meter the particulate at desired application rates. Losses and frictional effects within the system also increase the likelihood of lag and clogging. Many desire to reduce the power consumption of the particulate metering implement while controlling and/or ensuring consistent application rates across all the row units.

SUMMARY

The present disclosure provides a particulate metering system with variable application rate controls for separate discharges or a group of discharges.

The particulate metering system includes an air flow origin and a plurality of particulate accelerators. Each of the particulate accelerators can have an air input, an air-particulate interface, a mixing area, and an air-particulate output. A single particulate source is in communication with the particulate accelerators. A plurality of operated conveyances is provided. Each of the operated conveyances can be in operable communication with the single particulate source and the air-particulate interface of one of the particulate accelerators. The system includes a confluence of the air flow and the particulate within the mixing area of each of the particulate accelerators. Each of a plurality of discharges can be associated with the air-particulate output of one of the particulate accelerators. Two or more of the operated conveyances can operate at a different rate.

The air input of each of the particulate accelerators receives an air flow from the air flow origin. The system can further include a plurality of metering controls in operable communication with the operated conveyances to control a rate of the particulate conveyed to the confluence. One of the metering controls can operate independently and dependent upon another one of the metering controls. The particulate conveyed to the particulate accelerators can be equally distributed across the air-particulate interface of each of the particulate accelerators and unequally distributed across the air-particulate interface of each of the particulate accelerators.

According to another aspect of the disclosure, the particulate metering system includes a particulate flow path having a particulate storage area and a plurality of particulate accelerators. Each of the particulate accelerators has an air-particulate output and a mixing area. The particulate flow path can further include a plurality of operated conveyances in operable communication with the particulate storage area, and a discharge line connected to the air-particulate output of each of the particulate accelerators. The operated conveyances convey particulate from the particulate storage areas to each of the particulate accelerators. The particulate can descend vertically within the particulate accelerators into the mixing area. The particulate can mix with and be suspended by air in the mixing area. A resulting air-particulate mixture moves through the air-particulate output into the discharge line.

One or more drive systems can be in operable control of the operated conveyances. Further, one or more rate controllers can be in operable control of the one or more drive systems. A first subset of the operated conveyances can be associated with a first drive system, and a second subset of the operated conveyances can be associated with a second drive system. The first drive system and the second drive system can operate independently and/or at varied speeds.

According to yet another aspect of the disclosure, a particulate storage area containing one or more types of particulate is provided. A plurality of particulate accelerators is in communication with the particulate storage area. The system includes a first configuration of a plurality of gearboxes in operable communication with the particulate storage area and the particulate accelerators, and a second configuration of the gearboxes in operable communication with the particulate storage area and the particulate accelerators. A drive shaft is in operable communication with the first configuration of gearboxes or the second configuration of gearboxes. A motor can be in operable control of the drive shaft. The gearboxes can convey particulate from the particulate storage area to the particulate accelerators.

The quantity of gearboxes in the first configuration can be more or less than a quantity of the gearboxes in the second configuration. The gearboxes can be inverted, so the inverted gearboxes are not in operable communication with the drive shaft. A second drive shaft can be operable control of the inverted plurality of gearboxes.

The system can include a plurality of motors. Each of the motors is operatively connected to one of the plurality of gearboxes. Each of the motors can be independently controllable.

A plurality of cartridges can be provided. Each of the cartridges can be in operably connected to the gearboxes and in communication with the particulate storage area.

BRIEF DESCRIPTION OF THE DRAWINGS

Illustrated embodiments of the disclosure are described in detail below with reference to the attached drawing figures, which are incorporated by reference herein, and where:

FIG. 2B is a side elevation view of a particulate container in accordance of an illustrative embodiment;

DETAILED DESCRIPTION

Figure 1:
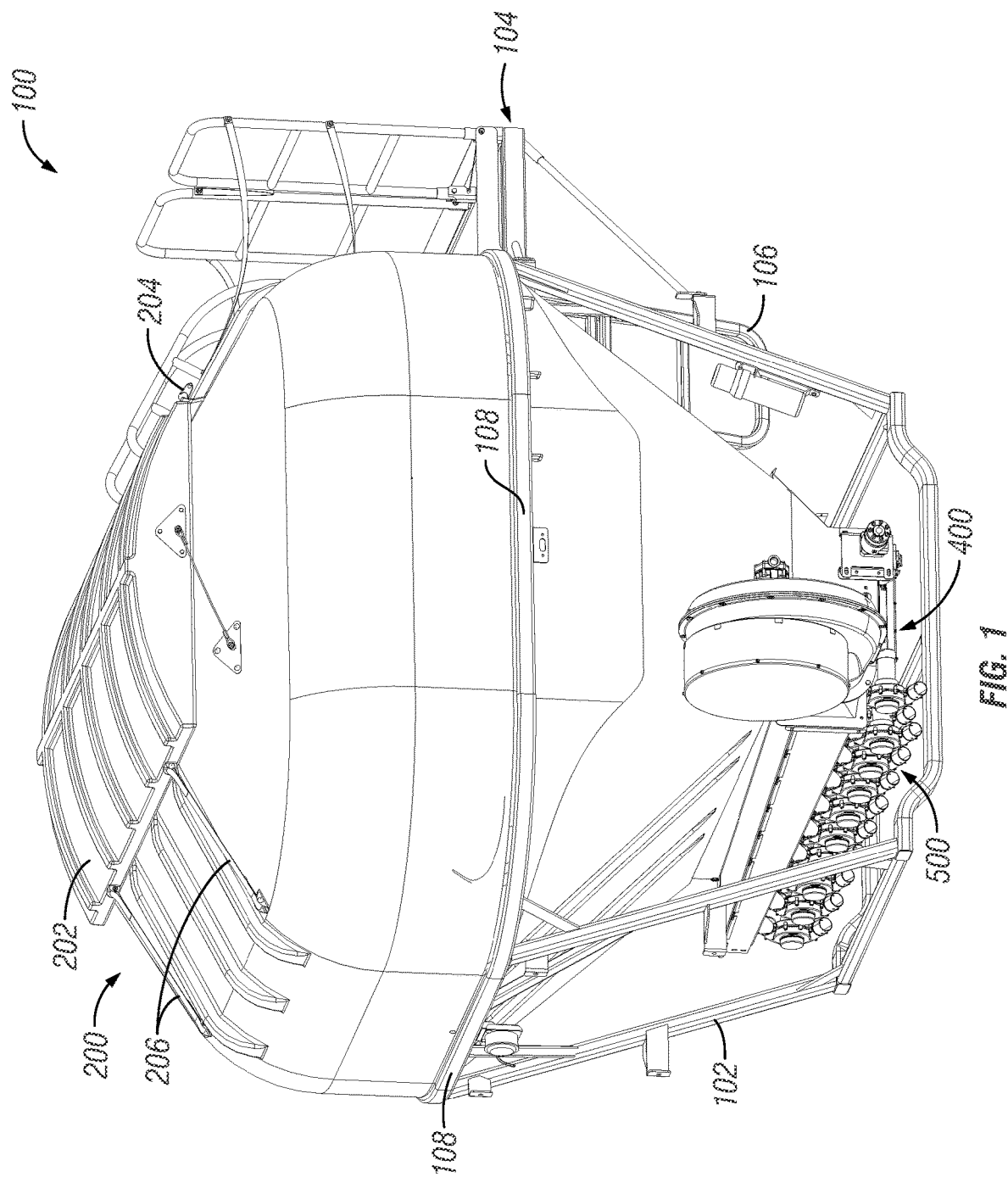
FIG. 1 is a front perspective view of a particulate metering implement in accordance with an illustrative embodiment.

FIG. 1 shows a particulate metering implement 100. While the figure shows a particulate metering implement, it should be appreciated by those skilled in the art the disclosure covers other types of implements, including but not limited to, seed meters, seed planters, nutrient applicators, and other agricultural equipment. The implement 100 can be mounted upon a towable trailer or other suitable structure such as a toolbar, or integrally formed with a particulate application system. The implement can include a frame assembly 102, upon which a particulate container 200 is disposed. For user accessibility to the particulate container 200, a platform 104 and a ladder 106 can be provided. The implement can also include a particulate handling system 300 (FIG. 2), an air production and handling system 400, and particulate accelerator system 500.

The particulate container 200 can be connected to the frame assembly 102 by frame members 108. The frame members 108 can generally be ring-shaped and surround a perimeter of the particulate container 200. The frame members 108 can engage a lower surface 216 extending outwardly from the particulate container 200, as shown illustratively in FIG. 2B. The interface between the lower surface 216 of the particulate container 200 and the frame members 108 can permit the particulate container 200 to be efficiently removed from the implement. Based on the tapering nature of the middle portions 212 and lower portions 214 (FIG. 2B) of the particulate container 200, the containers can be raised through the perimeter defined by the frame members 108. Thereafter, a replacement particulate container can be efficiently installed; or a substitute container (with different dimensions, structure, function, etc.) can be efficiently installed, thereby increasing the modularity of the implement.

Figure 2A:
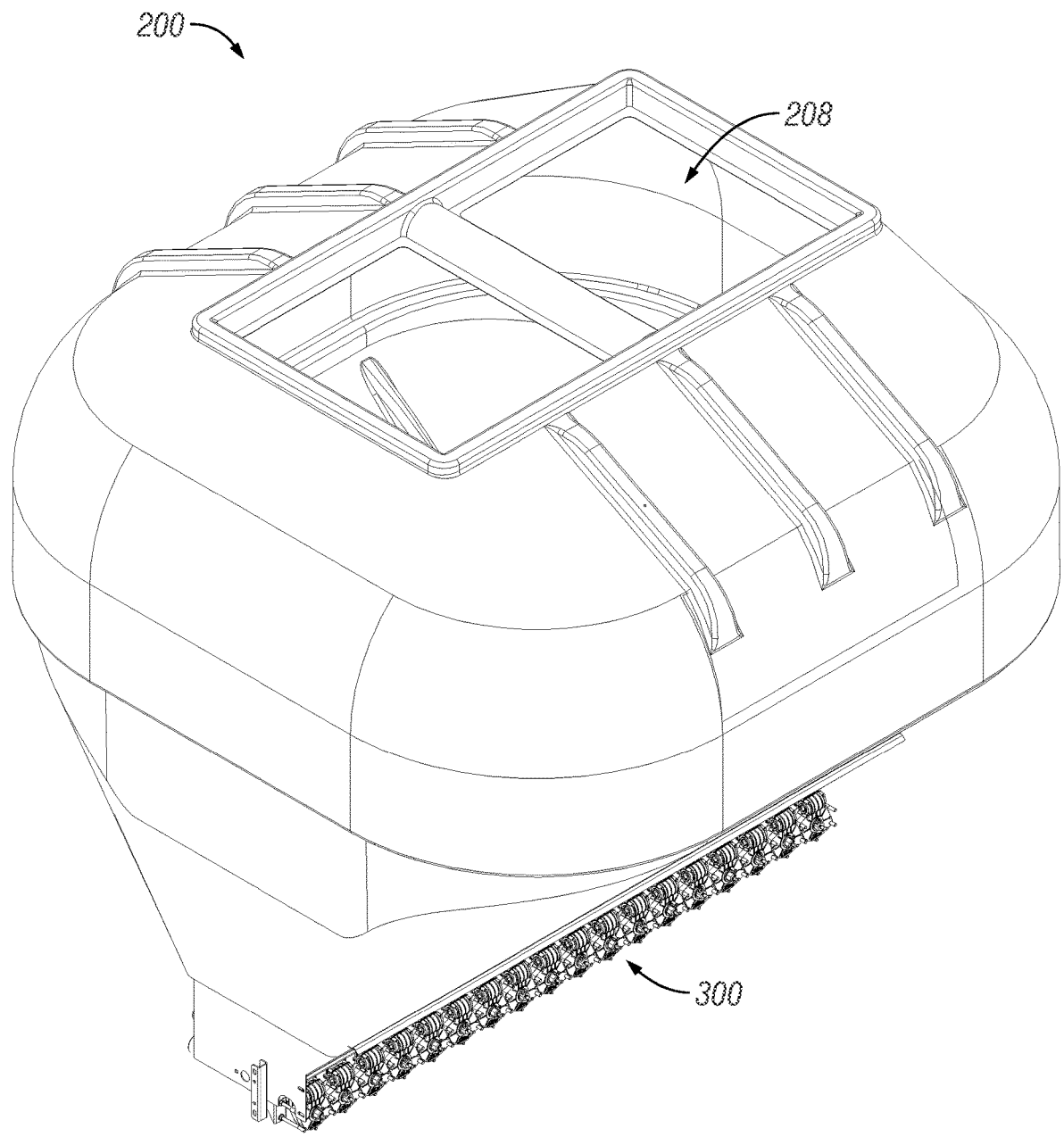
FIG. 2A is an isometric view of a particulate container in accordance with an illustrative embodiment.

Referring to FIGS. 1 and 2A, a top surface of the particulate container 200 can include openings 208 covered by one or more lids 202. The lid 202 can be opened or removed to permit loading of particulate into and/or servicing the particulate container 200. In an exemplary embodiment, an edge of the lid 202 can be releasably connected to the particulate container 200 with one or more straps 206. The present disclosure also contemplates hinges, rails, and other fastening means commonly known in the art to releasably secure the lid 202 to the particulate container 200. One or more clamps 204 can be mounted on the particulate container 200 proximate to the opposing edge of the lids 202 to releasably secure the lids to the containers. Upon opening and/or removal of the lid 202, one or more screens (not shown) can be disposed within the openings of the particulate container 200 to prevent debris from entering the same.

Further, the clamps 204 can provide an airtight seal between the lid 202 and the particulate container 200. In such an embodiment, the airtight seal can permit the particulate container 200 to be pressurized. In one representative example, the particulate container 200 can be pressurized to ten, fifteen, twenty or greater inches of water (inH$_2$O). The pressurization can assist in guiding the particulate to the particulate handling system 300, provide for improved control of quantities dispensed to the particulate handling system 300, and/or provide for improved control of the environment in which the particulate is housed.

Referring to FIG. 2B, particulate container 200 can include an upper portion 210, a middle portion 212, and a lower portion 214. The upper portion 210 can generally be a rectangular prism or like shapes to maximize storage capacity above the frame assembly. The middle portion 212 can be a trapezium prism or like shapes to assist in funneling the particulate to the lower portion 214. The transition from the upper portion 210 to the middle portion 212 can be generally demarcated by the frame members 108 disposed around the perimeter of the particulate container 200. The lower portion 214 can also be a trapezium prism or like shapes to assist in funneling the particulate to the base of the particulate container 200. Further, to assist in servicing the inside of the particulate container 200, a ladder (not shown) can be provided.

In addition to the shape of the particulate container 200, other means can be provided on or within the container to assist in funneling the particulate to the base of the container and/or to prevent agglomerations of particulate within the container. Such means can include, but are not limited to, agitators, augers, pneumatics, belt drives, internal structures, and the like.

Figure 3:
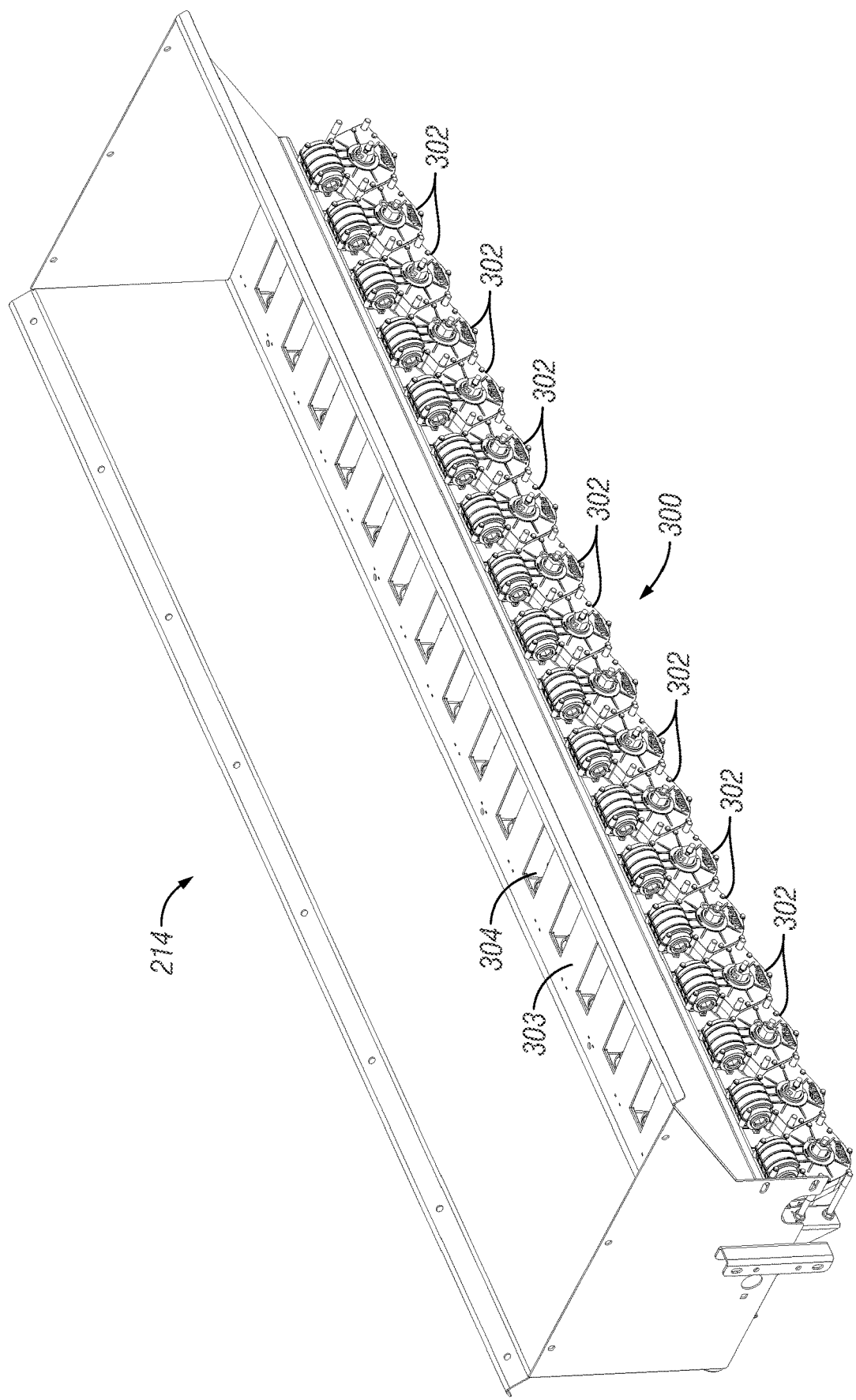
FIG. 3 is a cross-section view of the particulate container of FIG. 1B taken along section line 3-3.
Figure 4:
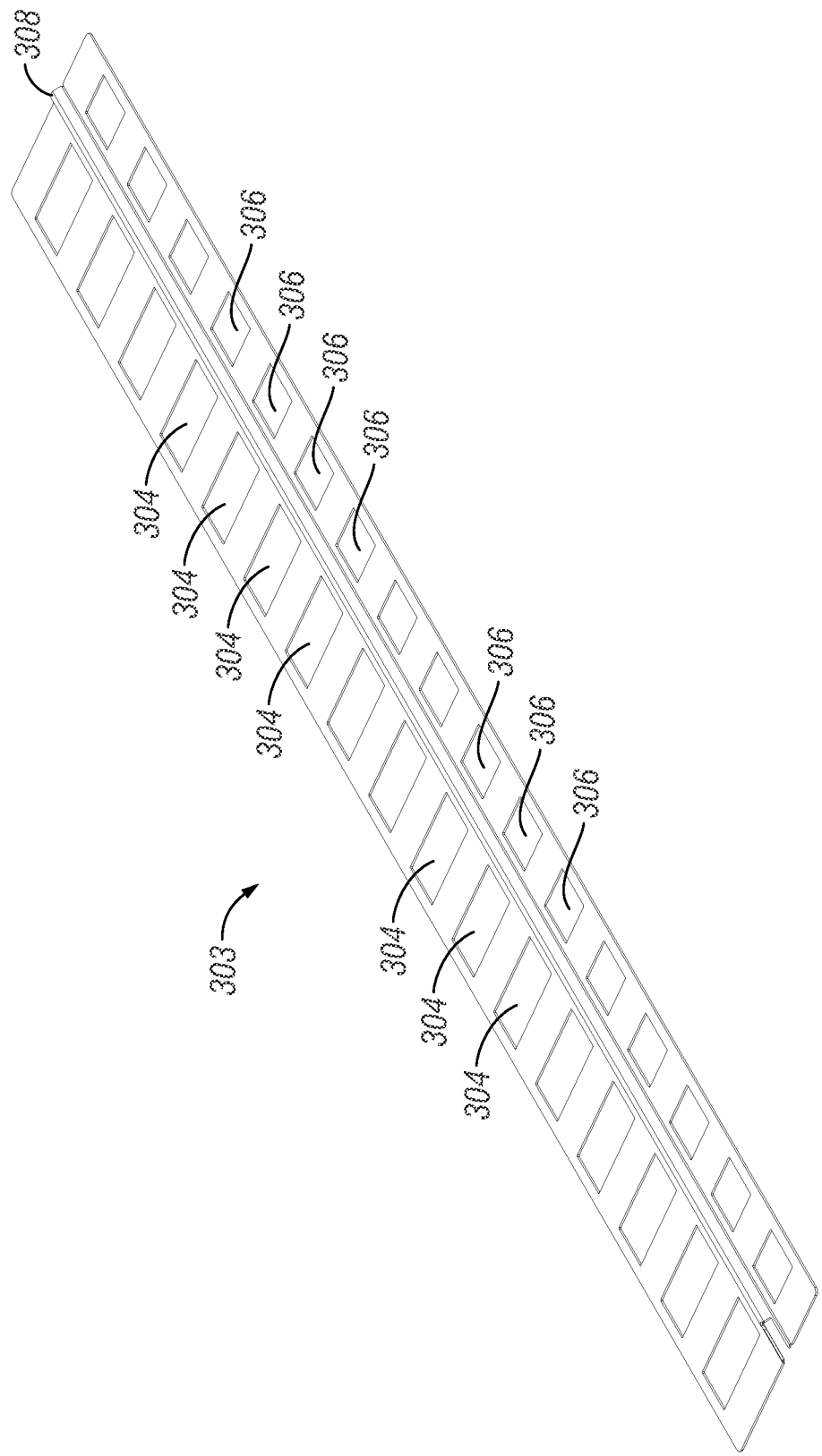
FIG. 4 is an isometric view of a bottom tray in accordance with an illustrative embodiment.

The lower portion 214 of the particulate container 200 can include a bottom tray 303, as shown in FIGS. 3 and 4. The bottom tray 303 can include a plurality of large gates 304 and a plurality of small gates 306 arranged along the length of the bottom tray 303. The plurality of gates 304 and 306 can be square and/or rectangular, as shown, or can be of any shape to permit particulate to enter the particulate handling system 300. Similarly, the plurality of gates 304 and 306 can all be the same shape and/or size, or of varied shapes and/or sizes based on the application. The interstitial portions of the bottom tray 303 can be flat, as shown, or can have a wedged-shape configuration to funnel particulate to the plurality of gates 304 and 306. The bottom tray 303 can be integrally connected to the lower portion 214 of the particulate container 200 or can be removable to permit a user to quickly install a different bottom tray 303 based on the needs of the application, further increasing the modularity of the system. The plurality of large gates 304 and the plurality of small gates 306 can be separated by a raised portion 308. The raised portion 308 can funnel the particulate into the plurality of large gates 304 and the plurality of small gates 306 and/or add structural support along the length of the bottom tray 303. Separating the particulate into a pair of gates can minimize undesirable torqueing of the screw conveyors 324 (FIG. 6B) and auger motor(s) 452 (FIG. 13), particularly during initialization of the particulate handling system 300.

A plurality of moveable and/or controllable gate covers (not shown) can be installed on plurality of gates 304 and 306. The gate covers, when closed, can prevent particulate from filling the plurality of cartridges 310, as shown illustratively in FIGS. 5, 6A and 6B. The gate covers can be manually controlled or operatively controlled. The configuration can further increase the modularity of the metering system by limiting which discharge points (e.g., row units), if any, receive one or more of the types of particulate.

One or more scales (not shown) can be associated with each of the particulate container 200. The scales can be operatively connected to a control system and configured to weigh the particulate container 200. Together with one or more sensors associated with one or more gearboxes 312 (FIG. 5) discussed below, the system can provide real-time and/or post-operation feedback of the expected volume of particulate dispensed versus actual volume of particulate dispensed for each row in the field and/or for the overall particulate metering implement. To determine expected volume of particulate dispensed, speed sensors can measure the number of rotations of a shaft 326 with flightings 328, as shown illustratively in FIG. 6B. Based on the number and known dimensions of the flightings 328, including diameter and helix angle, an estimation of how much particulate is dispensed per revolution can be obtained. The estimation can be applied to each unit row for the particulate metering implement, each of which can be operating at varied rates. The total expected volume can then be compared to the change in weight (multiplied by the density of the particulate) as measured by the one or more scales associated with the particulate container 200. Further, in an embodiment utilizing real-time feedback, the control system can adjust based on the data provided to reconcile the expected volume of particulate dispensed versus actual volume of particulate dispensed. Still further, the data can be used by the control system to diagnose dysfunctional screw conveyor(s) 324 and/or auger motor(s) 452 (FIG. 13), and/or identify potential blockages of particulate within the particulate metering implement.

Figure 5:
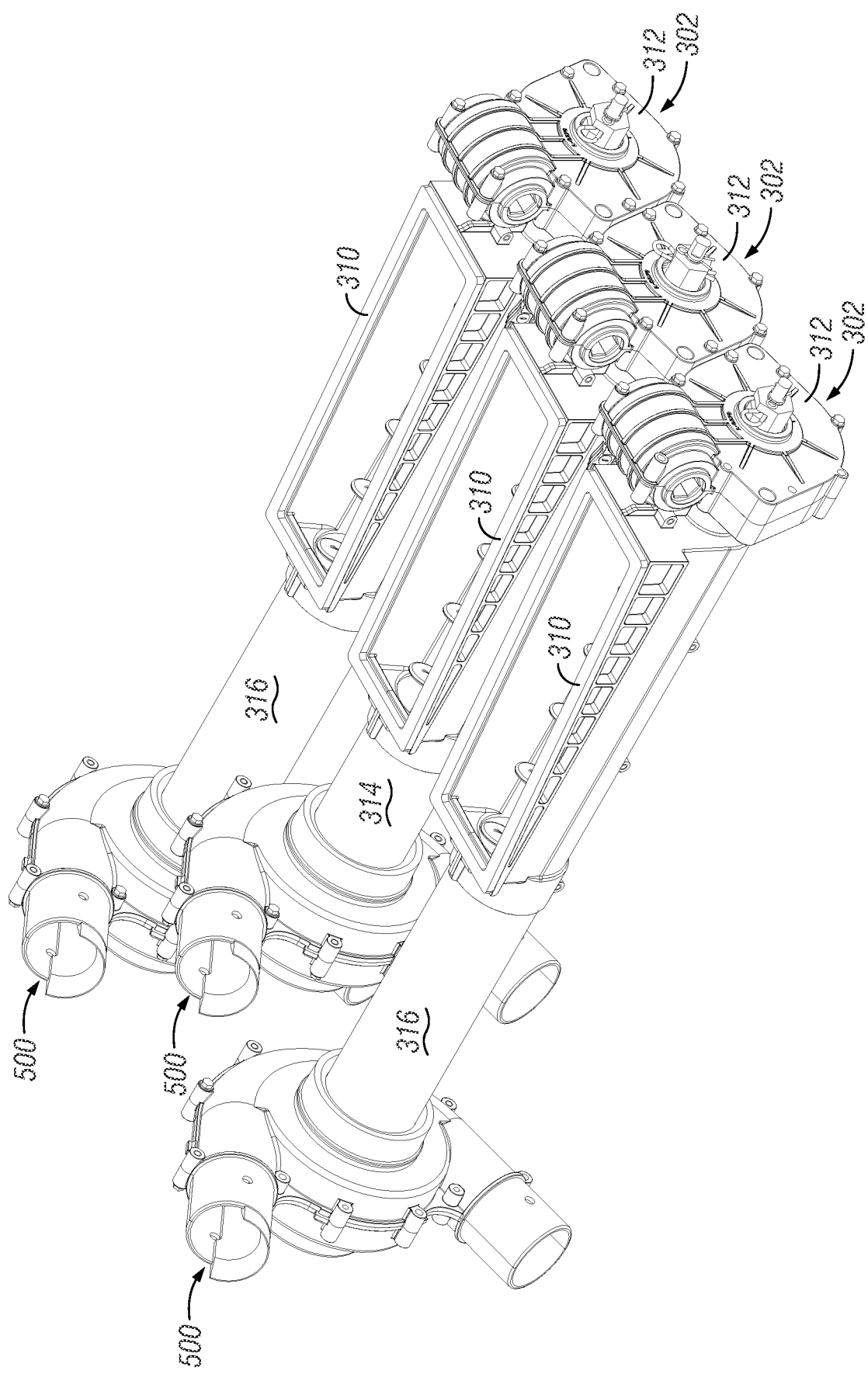
FIG. 5 is a front perspective view of particulate handling subsystems and a plurality of particulate accelerators in accordance with an illustrative embodiment.
Figure 6A:
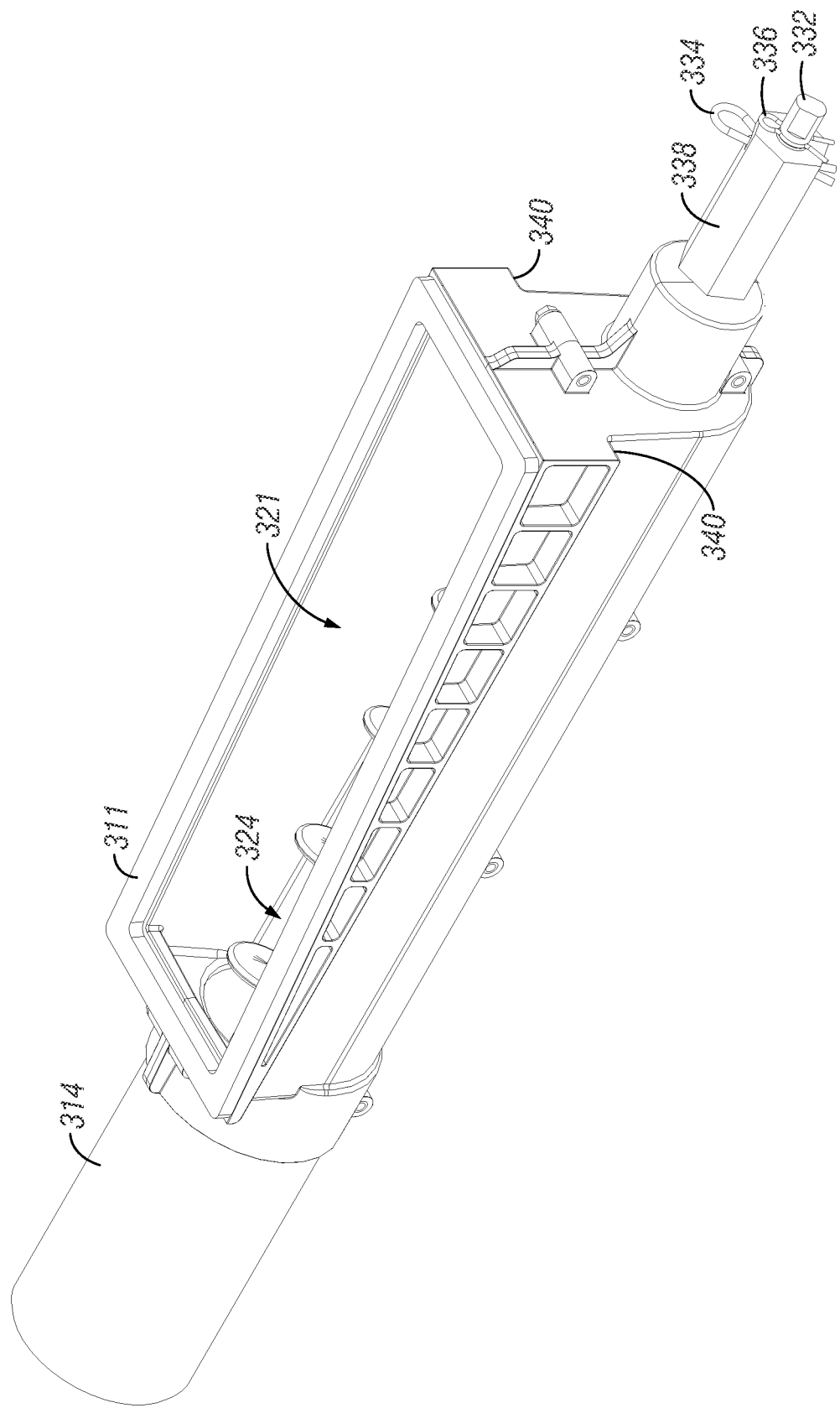
FIG. 6A is a front perspective view of a cartridge in accordance with an illustrative embodiment.
Figure 6B:
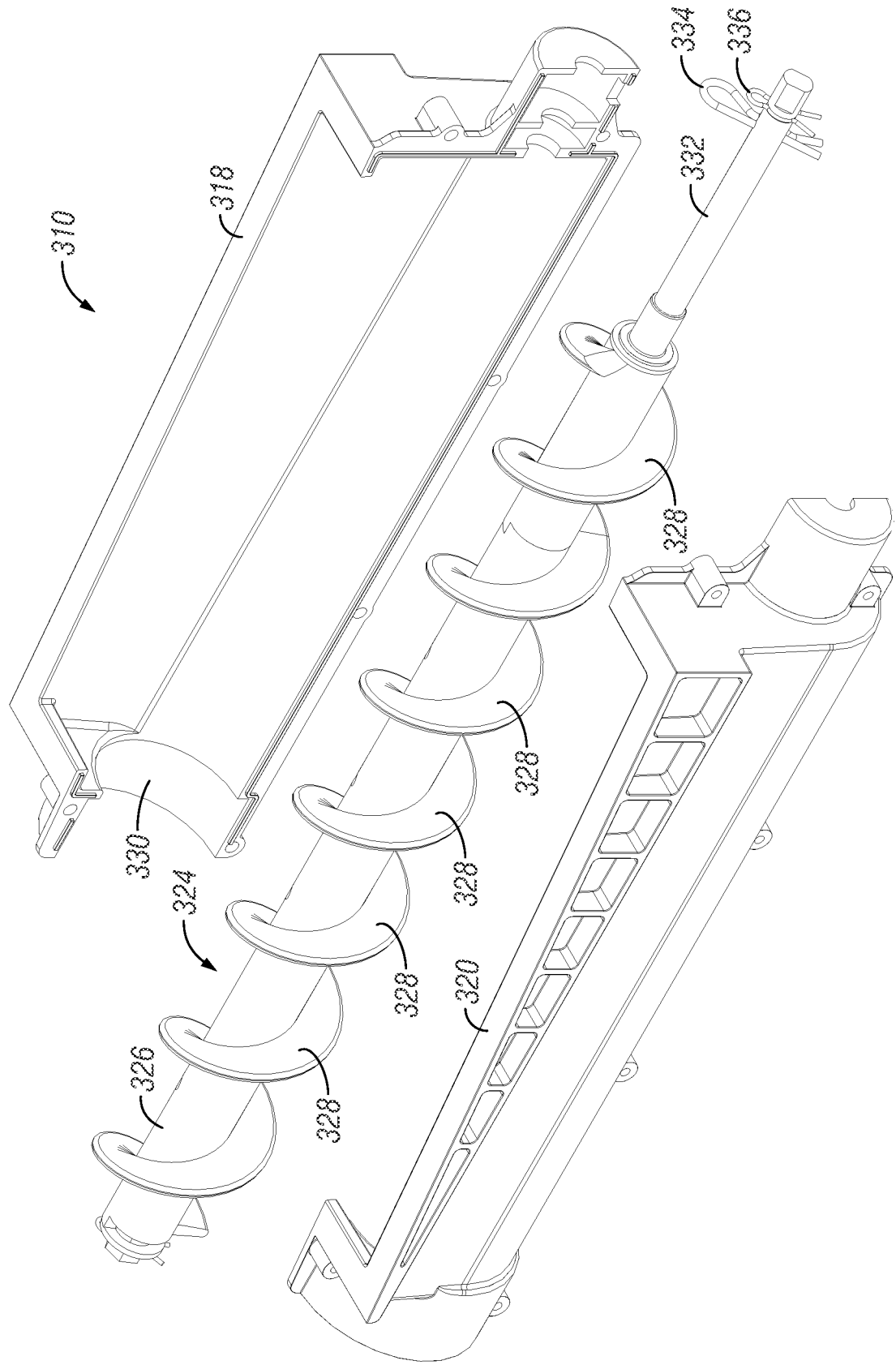
FIG. 6B is an exploded front perspective view of a cartridge in accordance with an illustrative embodiment.

Disposed below the bottom tray 303 can be a plurality of cartridges 310. An exemplary embodiment of the cartridge 310 is shown illustratively in FIGS. 5, 6A and 6B. Referring now to FIGS. 6A and 6B, each cartridge 310 can include an input slot 321 sized and shaped to receive particulate passing through the plurality of large gates 304 and the plurality of small gates 306 in the bottom tray 303. A gasket 311 can seal the cartridge 310 to the inferior side of bottom tray 303. The seal can prevent particulate from escaping the system, particularly in instances where the particulate container 200 is pressurized. The cartridge 310 can be constructed in two halves 318 and 320. Each of the two halves 318 and 320 can include a curved flange portion 330 adapted to receive a short auger tube 314 or a long auger tube 316 (FIG. 5). While two halves can provide for ease of manufacturing, the present disclosure also contemplates a unitary cartridge construction.

Within the input slot 321 of the cartridge 310 is a screw conveyor 324. In an exemplary embodiment shown illustratively in FIG. 6B, the screw conveyor 324 can include a shaft 326 and flightings 328 as commonly known in the art. The shaft 326 can be comprised of two shaft sections. While the embodiment can utilize a screw conveyor, it can be appreciated by those skilled in the art the disclosure covers other means of transmitting the material through a tube, including but not limited to, hydraulic pistons, pneumatics, slides, belts, and the like. External to the two halves 318 and 320 of the cartridge 310, the screw conveyor 324 can be coupled to an inner shaft 332. Encircling the inner shaft 322 can be a drive shaft 338, as shown illustratively in FIG. 6A. The inner shaft 332 and the drive shaft 388 can be rotatably engaged with a pin 334. The axial position of the drive shaft 338 on the inner shaft 332 can be preserved through a pin 336 extending through the inner shaft 332 proximate to an edge of the drive shaft 338. The drive shaft 388 can be hexagonal to engage a drive shaft opening 354 in the gearbox 312, as shown illustratively in FIGS. 6B and 7. The drive shaft 338 can be hexagonal as shown, or can be of any shape suitable to engage the gearbox 312 and achieve the objects of the disclosure. Further, the present disclosure also envisions the inner shaft 332 and the drive shaft 338 being a unitary construction.

Figure 7:
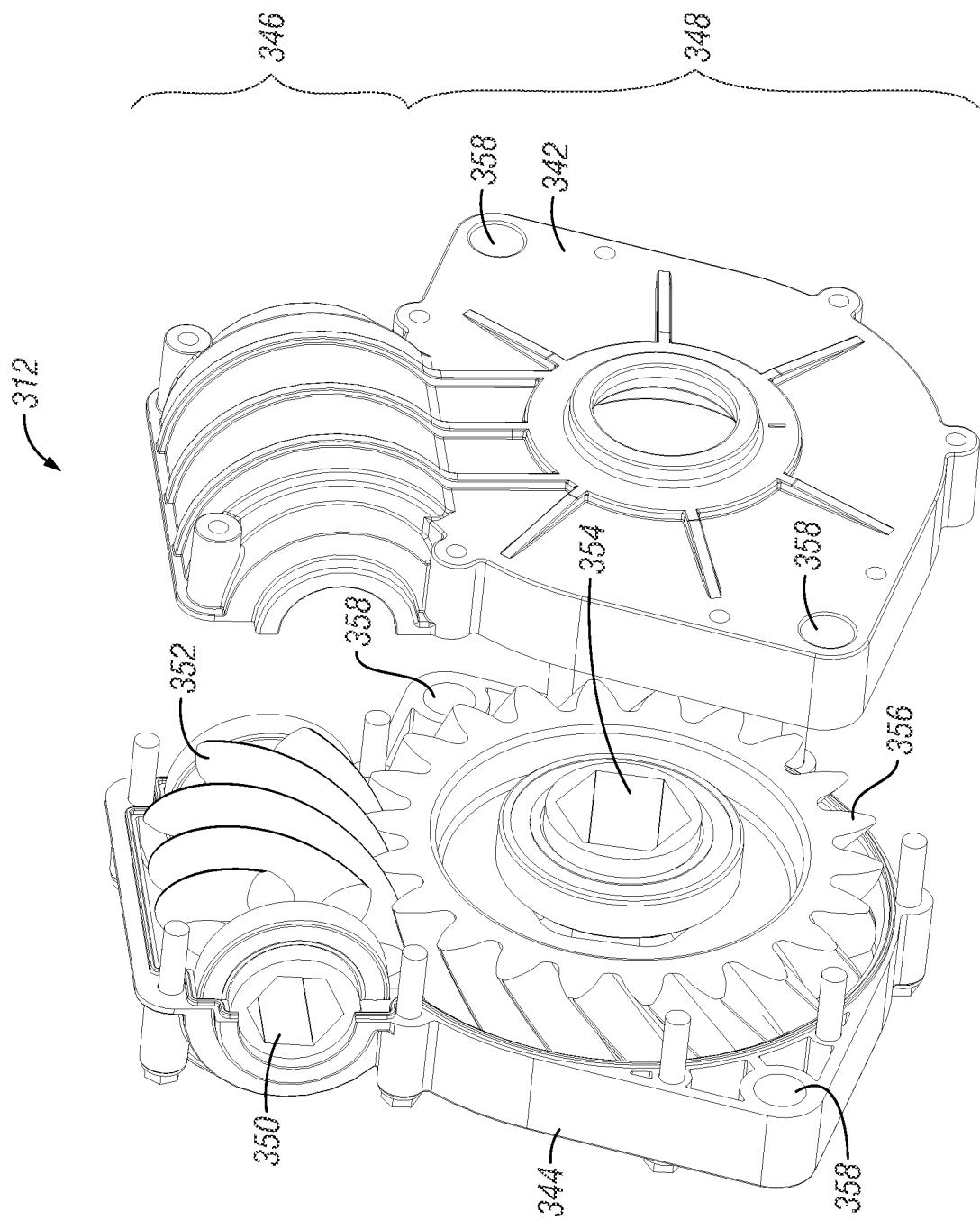
FIG. 7 is an exploded front perspective view of a gearbox in accordance with an illustrative embodiment.

FIG. 6 illustrates an exemplary gearbox 312. The gearbox 312 can be configured of two connectable halves 342 and 344 to provide for ease of manufacturing. The gearbox 312 can include an input portion 346 and an output portion 348. The input portion 346 can include a main shaft opening 350 extending through the input portion 346. The main shaft opening 350 can be adapted to receive and engage a main drive shaft 366 (FIG. 13). In the illustrative embodiment of FIG. 6, the main shaft opening 350 is hexagonal, but can be of any shape suitable to achieve the objects of the disclosure. The main shaft opening 350 can comprise an inner portion of an input helical gear 352. As one or more gearboxes 312 can be connected in parallel, as discussed below, the main drive shaft 366 can span the length of the particulate container 200 and simultaneously drive multiple gearboxes 312, as shown illustratively in FIG. 12. The output portion 348 can include a drive shaft opening 354 adapted to engage the drive shaft 338 of the cartridge 310, as discussed above. The drive shaft opening 354 can comprise an inner portion of an output helical gear 356. The input helical gear 352 and output helical gear 356 can be in a crossed configuration, as shown in FIG. 7. While the illustrative embodiment shows helical gears in a crossed configuration, the present disclosure contemplates any type of gearing needed to achieve the objects of the disclosure, including but not limited to, spur gears, bevel gears, spiral bevels, and the like. The drive shaft opening 354 can be orthogonal to main shaft opening 350, whereby each of the gearboxes 312 transfers the rotational speed and torque provided by the main drive shaft 366 to an associated screw conveyor 324 disposed within a cartridge 310. The present disclosure also contemplates other means for transferring the rotational speed and torque provided by the main drive shaft 366 to an associated screw conveyor 324 including but not limited to, electromagnetic induction, belts, and the like.

In another embodiment, a motor can be operatively connected to each cartridge, thereby removing the need for a gearbox. In the embodiment, the plurality of motors can be connected to the plurality of screw conveyors 324 to independently control each of the plurality of screw conveyors 324. Each of the plurality of motors can be operatively connected to a control system to produce a desired speed of each screw conveyor 324, of a group or bank of the screw conveyors 324, or of all the screw conveyors 324.

Referring to FIG. 5, the particulate handling system 300 can be comprised of a plurality of particulate handling subsystems 302. Each particulate handling subsystem 302 can be comprised of a cartridge 310 operatively connected to a gearbox 312 with a short auger tube 314 or long auger tube 316 extending from the cartridge 310. The plurality of short auger tubes 314 and long auger tubes 316 and can be alternately disposed in parallel below a particulate container, as shown illustratively in FIGS. 5 and 10. The alternating of the short auger tubes 314 and long auger tubes 316 can provide for a greater density of additional components disposed between particulate container 200, and more particularly, a plurality of particulate accelerators 500.

Figure 8:
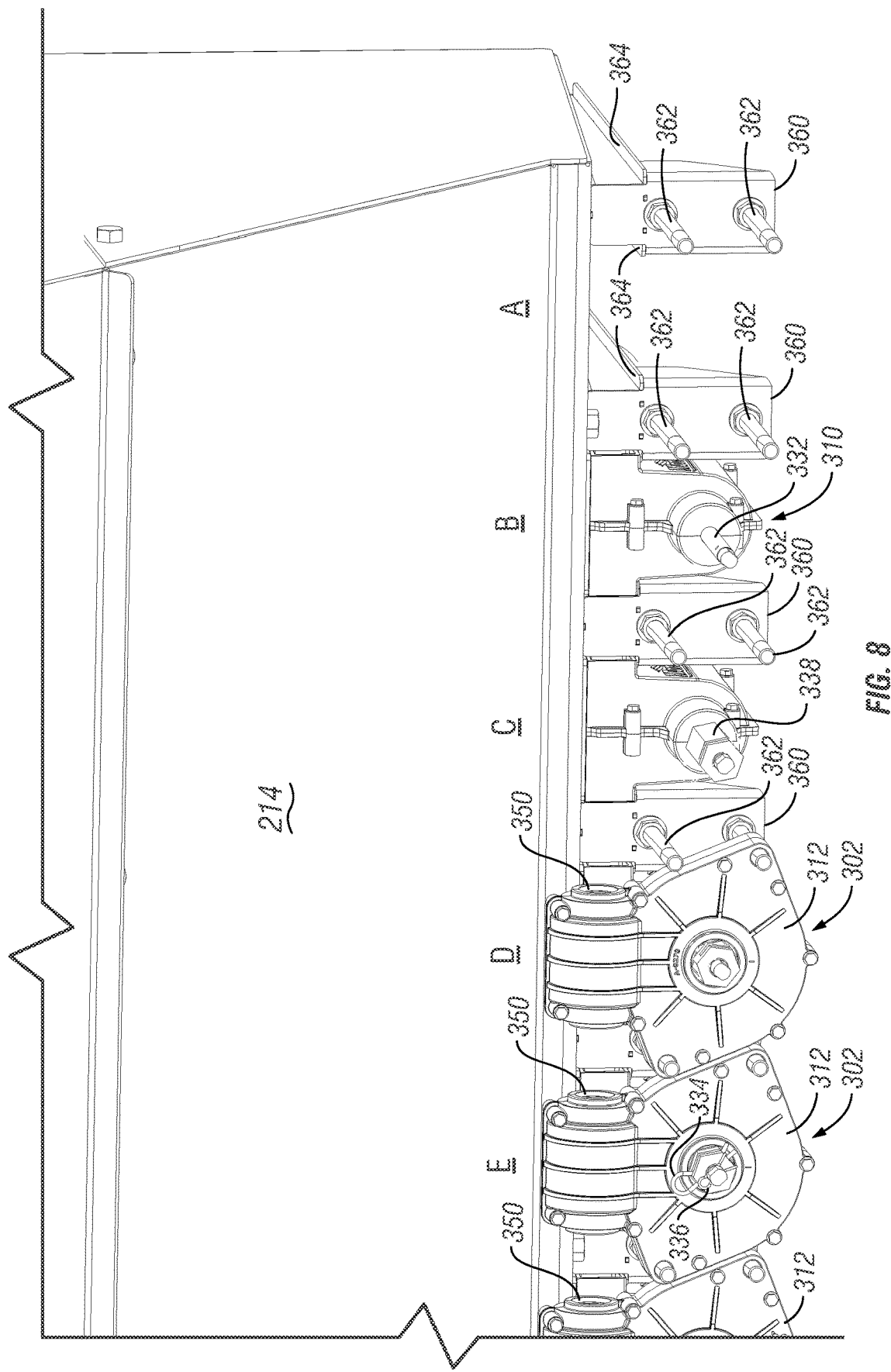
FIG. 8 is a partial front perspective view of particulate handling subsystems at various stages of installation in accordance with an illustrative embodiment.

As best shown illustratively in FIG. 8, each of the cartridges 310 can be disposed between two hangars 360 affixed to the lower section 214 of the particulate container 200. Each of the hangars 360 can be welded to the container or can be affixed by any means commonly known in the art, including but not limited to, nut and bolt, screws, rivets, soldering, and the like. Extending outwardly along the length of the hangar 360 can be two guide surfaces 364. As discussed below, a guide surface 364 from adjacent hangars 360 can be adapted to receive a cartridge 310. The hangars 360 can also include two prongs 362. Each of the prongs 362 can be cylindrical or can be of any shape commonly known in the art to engage and/or secure a gearbox 312. Further, while the illustrated embodiment shows two prongs 362, the present disclosure contemplates any number of prongs without deviating from the objects of the disclosure.

In an alternative embodiment, the plurality of cartridges 310 can be secured below the bottom tray 303 by a support member (not shown) extending the length of the particulate container 200. The support member can be, for example, a generally U-shaped beam with a plurality of openings to support the cartridges.

FIG. 8 illustrates a plurality of particulate handling subsystems 302 at various stages of installation. Beginning below so-called Sector A, two hangars 360 can be connected to the bottom surface of the particulate container 200, as discussed above. The hangars 360 can be parallel to one another and spaced to provide for installation of a cartridge 310. The cartridge 310 can be installed by sliding a lower surface 340 of the input slot 320 (FIG. 5B) along guide surfaces 364, one from each of the adjacent hangars 360, as shown illustratively below Sector B. The advantageous design permits for ease of installation as well as removal and reinstallation should a cartridge 310 (and/or screw conveyor 324) need to be repaired or replaced with the same or different component. As illustrated below Sector C, the drive shaft 338 of the cartridge 310 can be installed over the inner shaft 332. The installation of the drive shaft 338 over the inner shaft 332 can occur either before or after the cartridge 310 has been installed between hangars 360. Thereafter, a gearbox 312 can be oriented so the mounting holes 358 (FIG. 7) are aligned with the prongs 362 of the hangars 360, as shown illustratively below Sector D. In such an orientation, the drive shaft opening 354 (FIG. 7) can also be aligned with the drive shaft 338 of the cartridge 310. After installation of the gearbox 312 on the drive shaft 338, a pin 334 can be installed to rotatably engage the inner shaft 332 and the drive shaft 338, and a pin 336 can be installed to axially secure the drive shaft 338 relative to the inner shaft 332, as shown illustratively below Sector E. Further, securing means commonly known in the art can be used to secure the gearbox 312 to the prongs 362. The installation process described above can be repeated for each row unit along the length of each of the particulate container 200. The main drive shaft 366 (FIG. 13) can extend through and engage the main drive shaft openings 350 in each of the gearboxes 312.

Each of the gearboxes 312 can have a clutch (not shown) in operable communication with a control system. At the direction of the user or based on instruction from the control system, the control system can engage/disengage one or more predetermined clutches in order to activate/deactivate the associated one or more screw conveyors. In such an instance, the particulate metering system can provide for section control.

Figure 9:
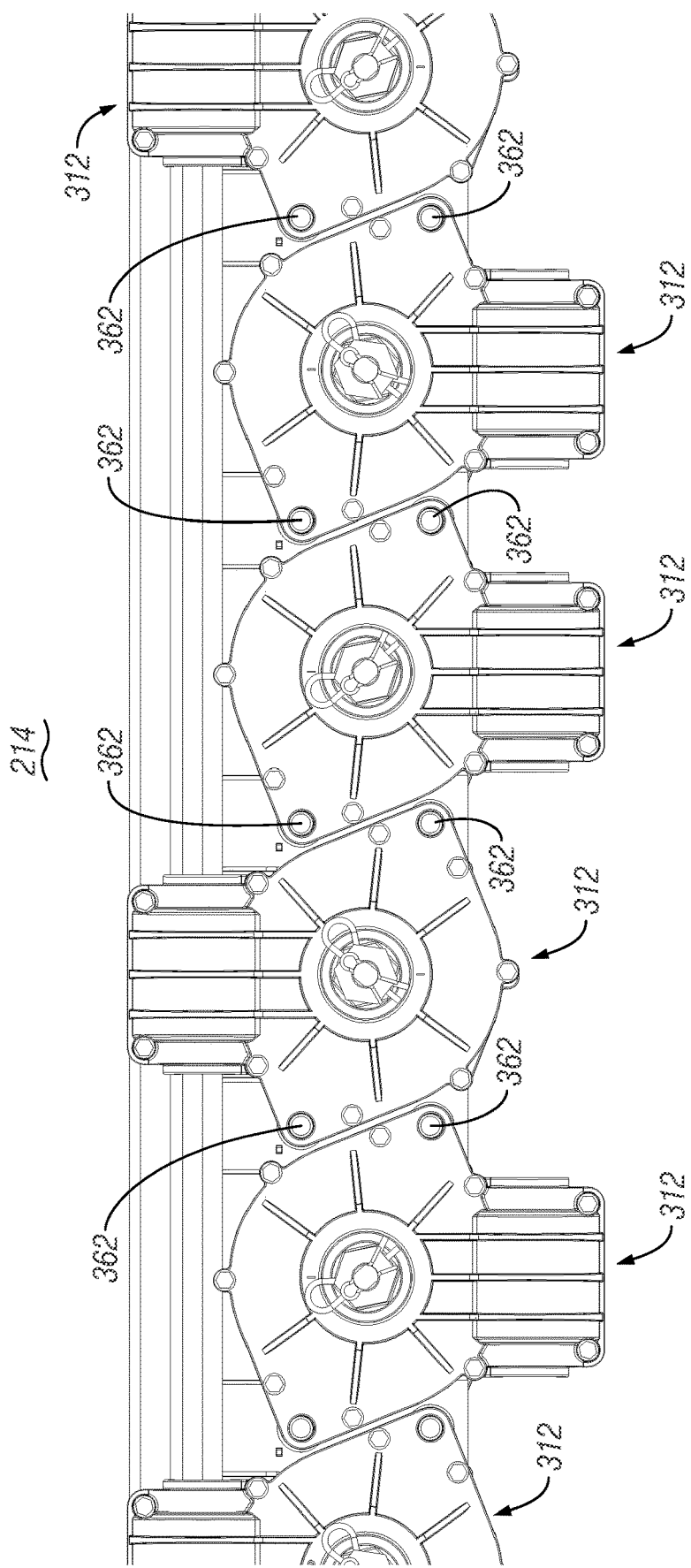
FIG. 9 is a partial front elevation view of a plurality of gearboxes in various configurations in accordance with an illustrative embodiment.

As shown illustratively in FIGS. 8 and 9, each of the two prongs 362 of one hangar 360 can be connected to adjacent gearboxes 312. In other words, an upper prong of a hangar can be connected to one gearbox while a lower prong of the same hangar can be connected to an adjacent gearbox. The arrangement is due to an advantageous design of the gearbox 312, which can permit one or more gearboxes 312 to be removed, inverted and reattached to the same two prongs as previously connected, as shown illustratively in FIG. 9. The inversion of a gearbox 312 can provide several advantages over the state of the art. First, in an inverted position, one or more of the gearboxes 312 can be disengaged from the main drive shaft 360 (FIG. 13) based on the needs of the application (e.g., in at least one instance, where one or more of the rows in the field does not require particulate metering). Second, a second main drive shaft (not shown) can be implemented and adapted to engage the one or more gearboxes 312 placed in an inverted position. The second main drive shaft can also extend the length of the particulate container 200 and can be parallel to the main drive shaft 366. In such an embodiment, the user can invert one gearbox or can invert multiple gearboxes to permit desired groupings of the same (e.g., every four gearboxes, every other gearbox, etc.) based on the needs of the operation/application. Furthermore, together with the same modularity for the companion particulate handling system associated with a second particulate container, the potential configurations can permit precise control over the blends of the particulate from the containers as well as application rates in which the blends are metered. Still further, the means of securing the gearboxes 312 to the implement can provide for efficient installation and/or uninstallation of the gearboxes 312 in instances of malfunction or failure.

In operation, particulate within the particulate container 200 can pass through the plurality of large gates 304 and a plurality of small gates 306 of the bottom tray 303 and the input slots 320 of the plurality of cartridges 310, as best shown illustratively in FIG. 3. Referring now to FIG. 13, the main drive shaft 366 can be connected to the plurality of gearboxes 312. Upon receiving an input force from the auger motor 452 via the gearbox 312, the drive shaft 338 rotates the screw conveyors 324. The screw conveyors 324 can transmit the particulate contained within the short auger tube 314 and long auger tube 316 towards particulate accelerators 500. The process described above can also occur for each row unit along the length of the particulate container 200.

Figure 10:
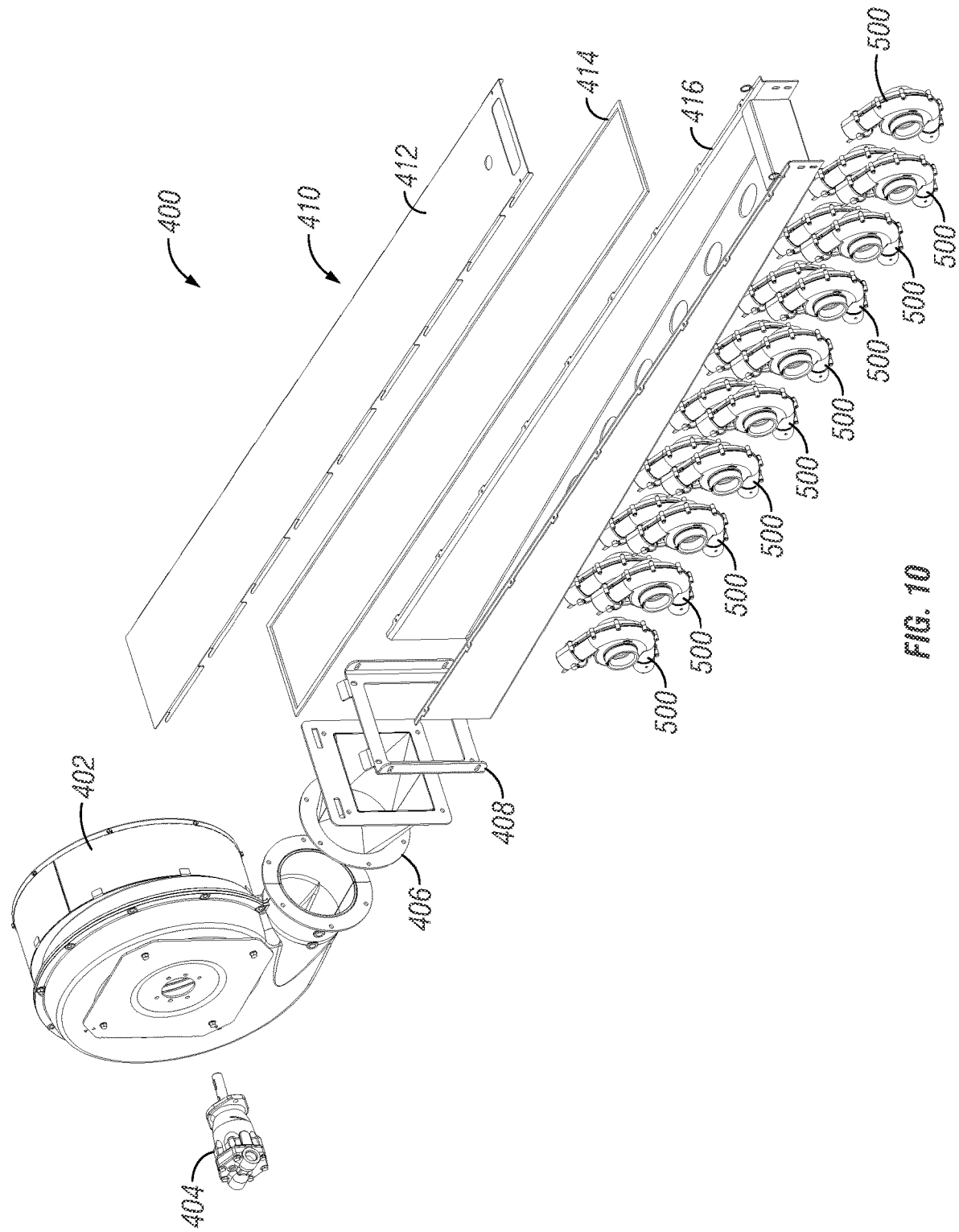
FIG. 10 is an exploded front perspective view of an air production and handling system in accordance with an illustrative embodiment.

The particulate metering implement 100 can include an air production and handling system 400 (FIG. 10). The air production and handling system 400 can be disposed between and below a portion of the particulate container 200.

FIG. 10 illustrates an exemplary air production and handling system 400. air production and handling system 400 can include a blower 402 driven by a blower motor 404 to produce an airflow. In an embodiment, a representative blower can operate at 20 horsepower (HP) and produce a volumetric flow rate 120-150 cubic feet per minute (CFM) per row in operation. The disclosure also contemplates the blower 402 operating at variable revolutions per minute (RPM). In such instances, the blower 402 can require less horsepower than operating at a constant RPM. Operating the blower 402 at a constant RPM and/or variable RPM can be tailored to the specific demands of the particulate metering system 402 in a given application.

Figure 11:
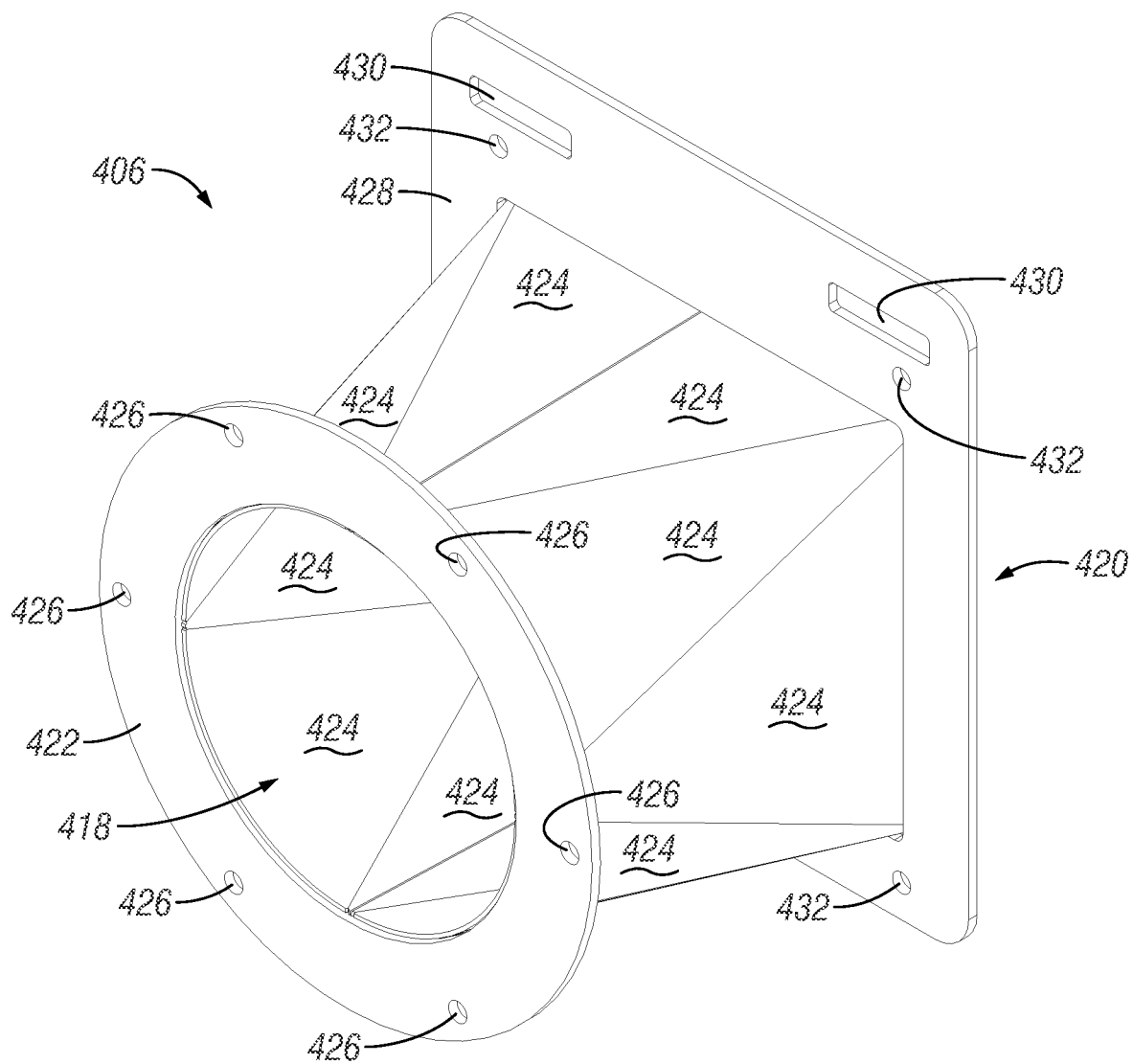
FIG. 11 is an isometric view of an expander in accordance with an illustrative embodiment.

The blower 402 can be coupled to a plenum 410 via an extension 406 and a bracket 408. Referring to FIG. 11, an inlet 418 side of an extension 406 can be connected to the blower 402 at an interface 422 to couple the blower 402 to the air production and handling system 400. The interface 422 between the blower 402 and the extension 406 can be a flange having holes 426 on the inlet of the extension 406 configured to be joined by nuts and bolts, or other means such as pinning, clamping, welding, and the like. The extension 406 can be comprised of a plurality of triangular-shaped surfaces 424 designed to impart desired flow properties as air enters the air production and handling system 400. The disclosure envisions alternative characteristics for the extension 406, including but not limited to, a circular cross-section, a nozzle, an expander, and the like. The extension 406 can be made of steel, but the disclosure contemplates other materials such as aluminum, polymers, composites, ceramics, and the like. An outlet 420 side of the extension 408 can have a plate 428 with slots 430 and holes 432 for coupling the extension 406 to the bracket 408, as shown illustratively in FIG. 10. Further, the extension 406 can permit efficient installation and uninstallation of the blower 402 on the air production and handling system 400. In such instances, the blower used in operation can be customized to the specific needs of the application, further increasing the modularity of the system.

Figure 12:
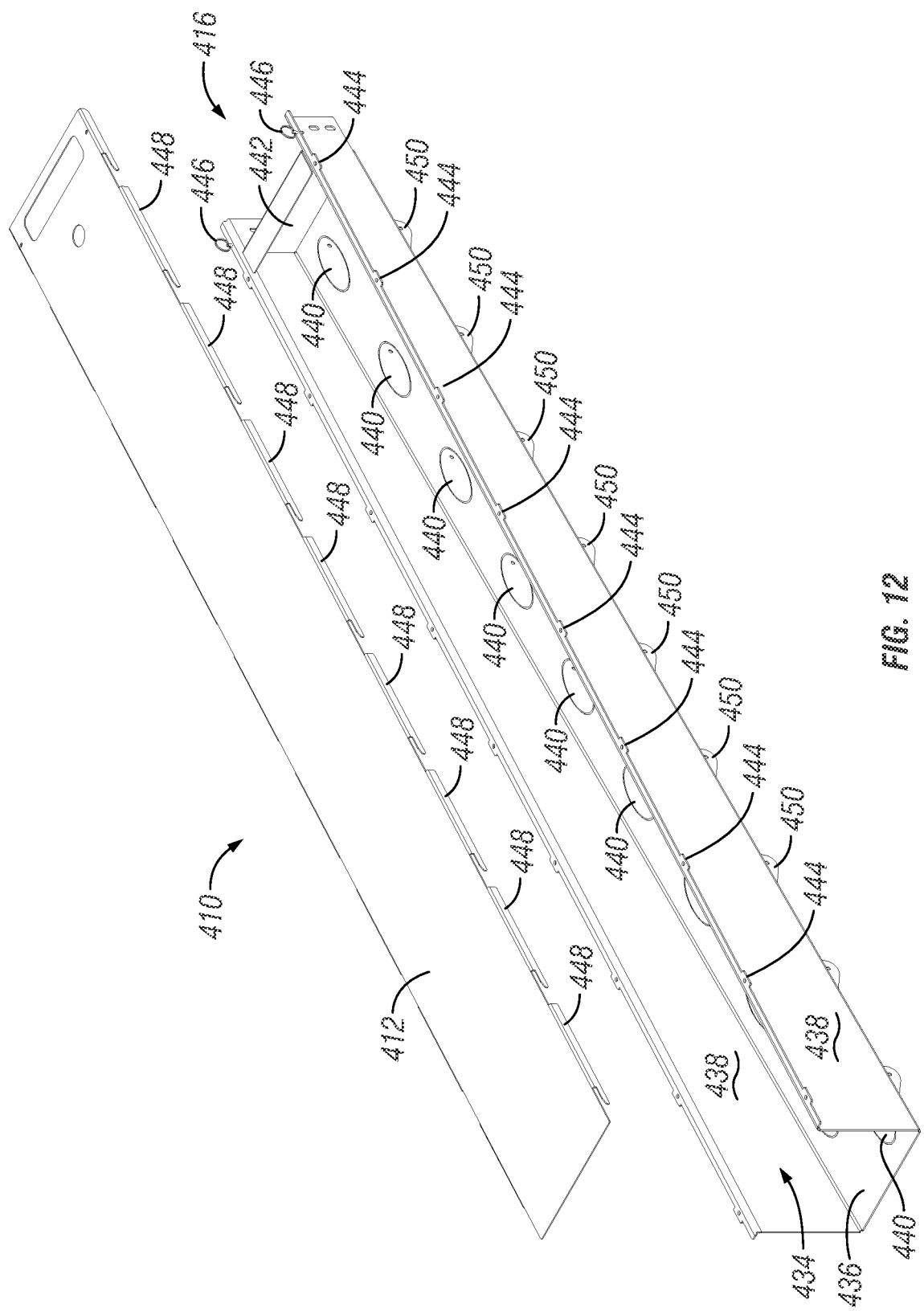
FIG. 12 is an exploded view of a plenum in accordance with an illustrative embodiment.
Figure 13:
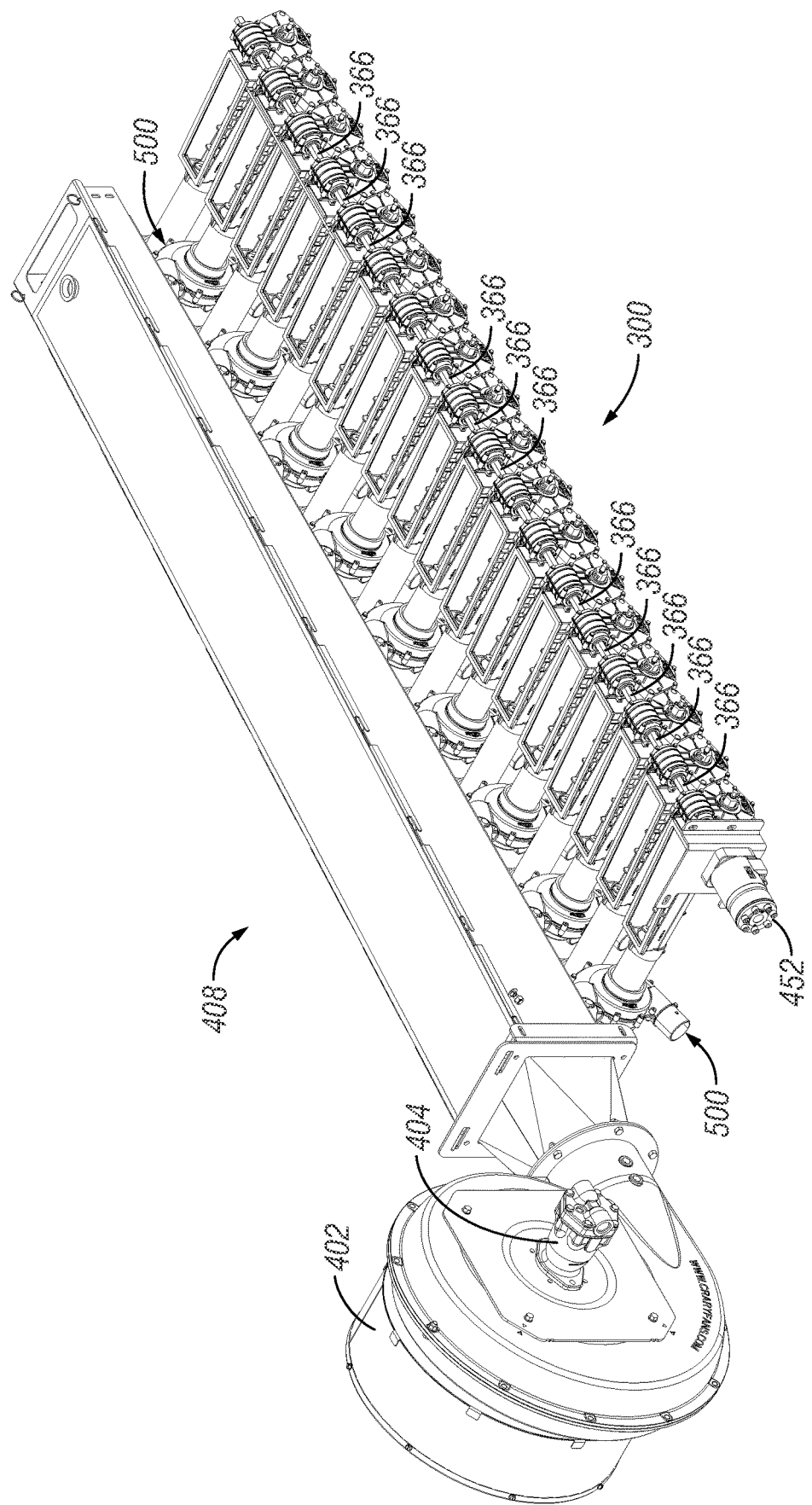
FIG. 13 is front perspective view of a particulate handling system, an air production and handling system, and a plurality of particulate accelerators in accordance with an illustrative embodiment.

After exiting the extension 406, the air generated by blower 402 can enter an intake 434 of a plenum 410 of the air production and handling system 400, as shown illustratively in FIG. 12. The plenum 410 can include a plenum cover 412 removably connected to a plenum base 410. When installed, the plenum cover 412 can be sealed to the plenum base 416 with a gasket 414 (FIG. 10) contoured to outer edges of the same. To install or uninstall the plenum cover 412, the plenum cover 412 can include a plurality of downwardly extending flanges 448 adapted to mate with flanges 444 extending outwardly along the length of the sidewalls 438 of the plenum base 416. Gaps between the flanges 444 on the plenum base 416 can receive to the plurality of downwardly extending flanges 448 on the plenum cover 412, after which the plenum cover 412 can be slid laterally into a locked position. Thereafter, pins 446 can be installed to ensure the plenum cover 412 remains in the locked position. The securing means can provide for rapid accessibility to the interior of the plenum 410 for servicing and the like.

The plenum base 416 can contain opposing sidewalls 438, a bottom wall 436 and a distal wall 442. A plurality of apertures 440 can be disposed within the bottom wall 436 of the plenum base 416. The plurality of apertures 440 can be arranged in two rows along the length of the plenum 410. The two rows of apertures 440 along the length of the plenum base 416 can be staggered longitudinally to maximize compactness of the particulate accelerators 500 disposed below the plenum and/or to impart the desired airflow characteristics within the plenum 410. The plurality of apertures 440 can be elliptical in shape. The disclosure, however, envisions other arrangements and/or shapes of the plurality of apertures without detracting from the objects of the disclosure. For example, the plurality of apertures 440 can be arranged in one row along the length of the plenum base 416, or the plurality of apertures 440 can be circular or rectangular in shape. The disclosure also contemplates the plurality of apertures disposed the sidewalls 438 and/or the plenum cover 412.

The sidewalls 438 can be trapezoidal in shape. In other words, at an edge of the plenum base 416 proximate to the intake 434, the sidewalls 438 are greater than the height of the same proximate to the distal wall 442. The tapering of the plenum base 416 can maintain the appropriate pressure and airflow characteristics along its length as air exits the plenum 410 through the plurality of apertures 440.

A plurality of outlet pipes 450 can be connected to the bottom wall 436 of the plenum base 416. Each of the plurality of outlet pipes 450 can be associated with each of the plurality of apertures 440. The outlet pipes 450 can be cylindrical in shape, but the disclosure envisions different shapes, including oval, ellipsoid, rectangular, square, and the like. The outlet pipes 450 can be secured the bottom wall 436 by means commonly known in the art, including but not limited to, pinning, welding, fastening, clamping, and the like. The outlet pipes 450 can be oriented so an acute angle exists between the major axis of the outlet pipes 450 and the bottom wall 436 of the plenum base 416. The orientation of the outlet pipes 450 can impart the appropriate flow characteristics as air transitions from the plenum 410 to a particulate accelerator system 500 (FIG. 10).

Figure 14:
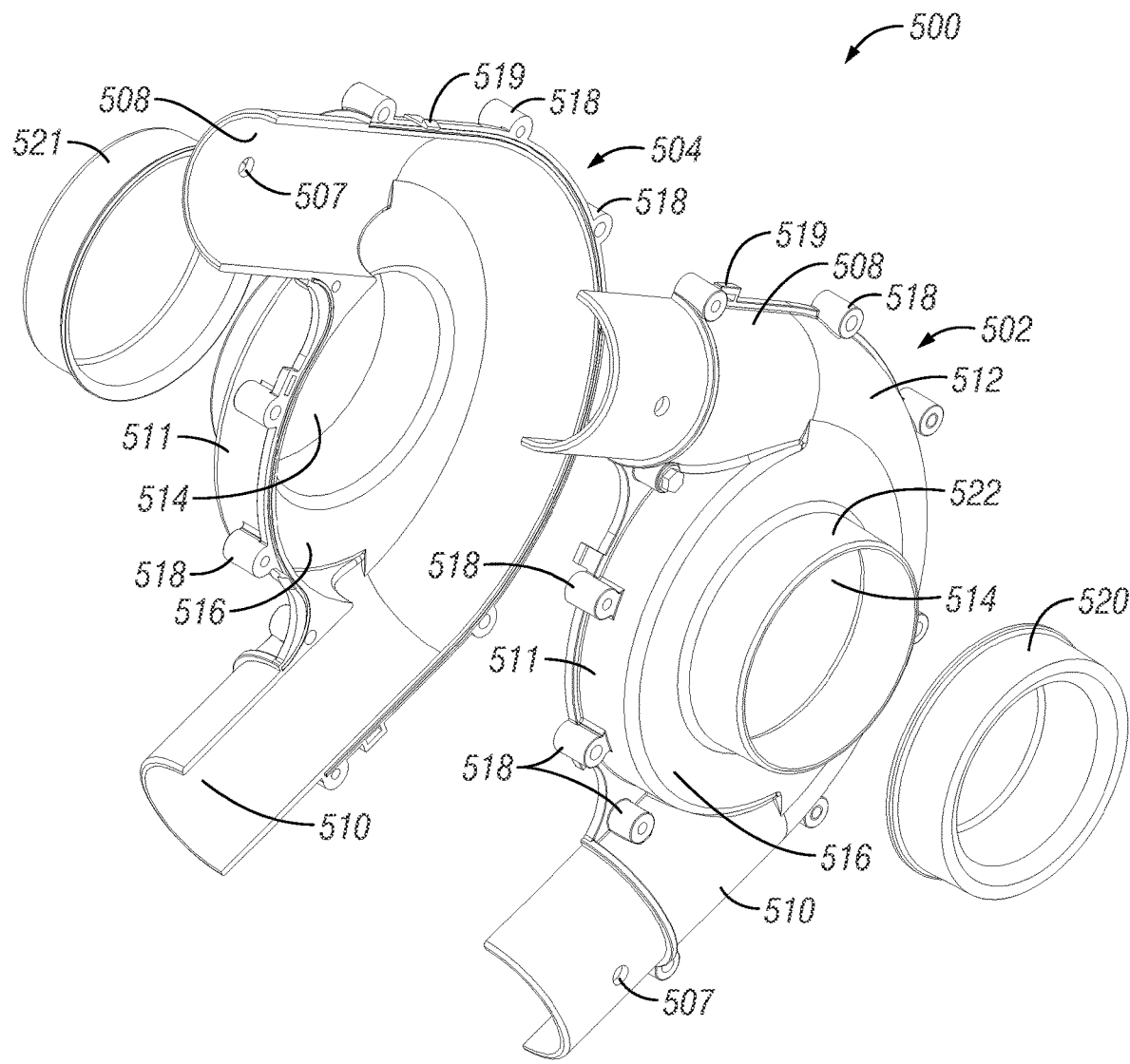
FIG. 14 is an exploded front perspective view of a particulate accelerator in accordance with an illustrative embodiment.
Figure 15A:
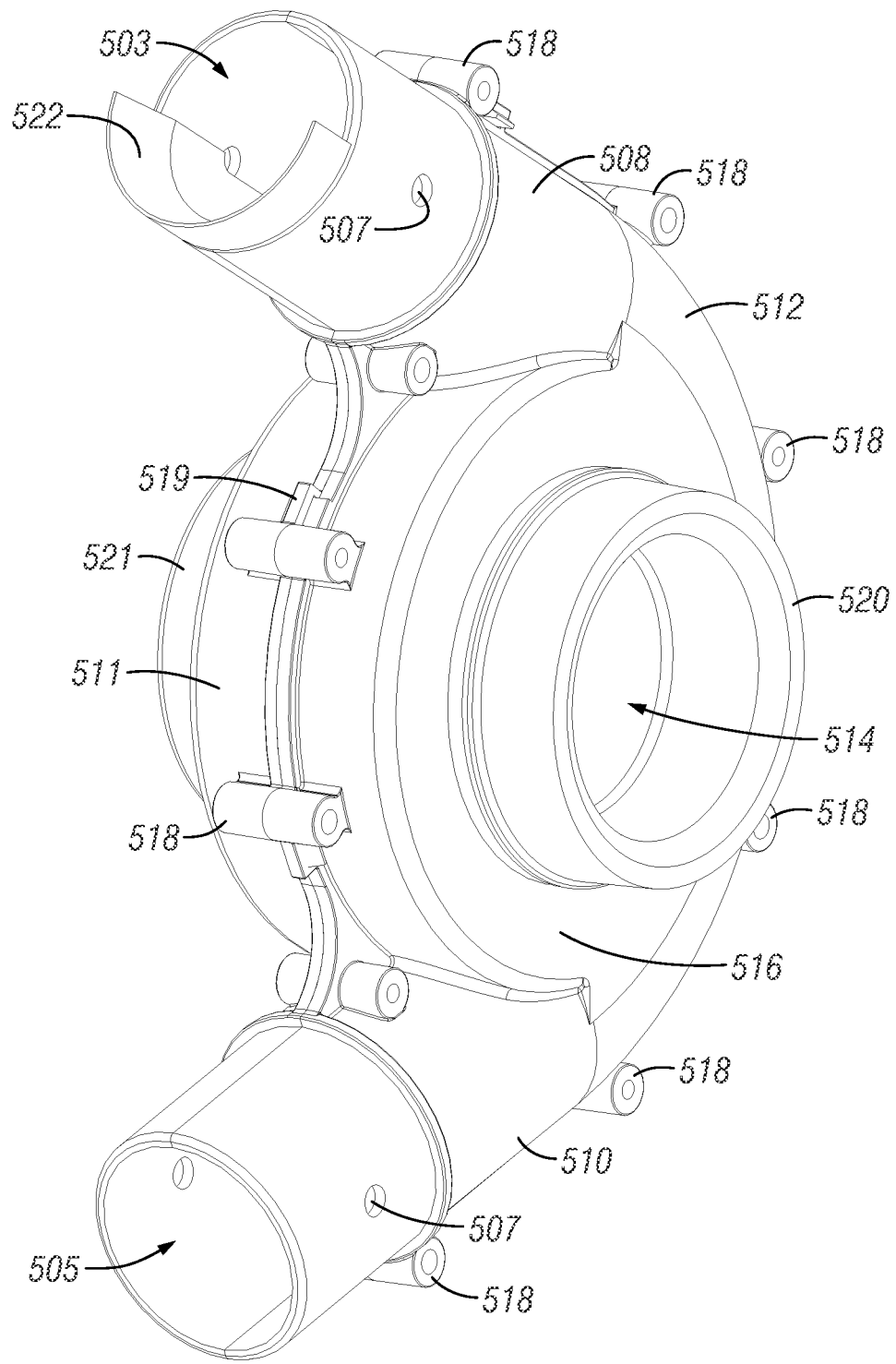
FIG. 15A is a front perspective view of a particulate accelerator in accordance with an illustrative embodiment.
Figure 15B:
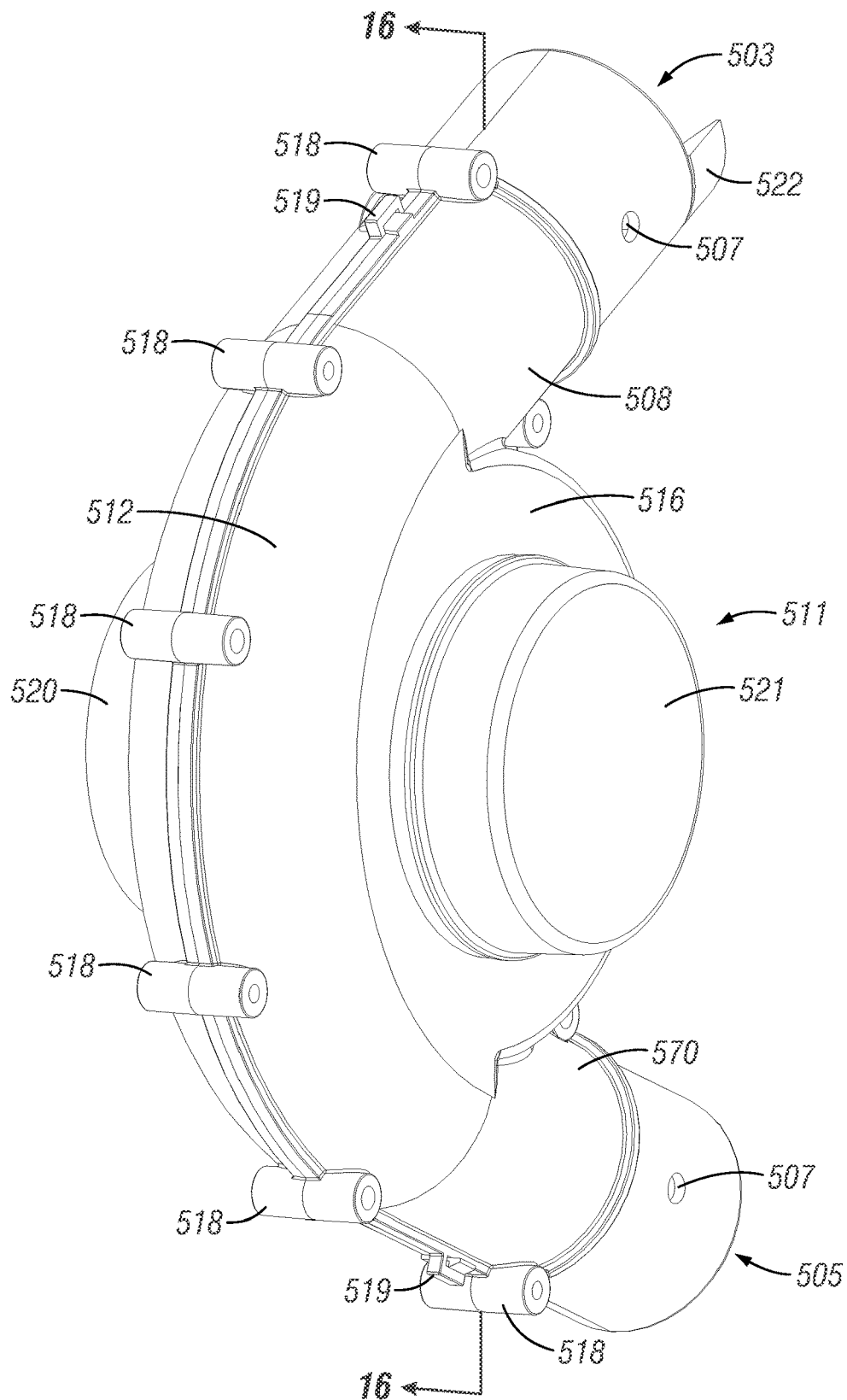
FIG. 15B is a rear perspective view of a particulate accelerator in accordance with an illustrative embodiment.

After passing through the plenum 410 and outlet pipes 450, air generated by the blower 402 can enter a plurality of particulate accelerators 500. Referring to FIGS. 14, 15A and 15B, each of the plurality of particulate accelerators 500 can be comprised of two opposing halves 502 and 504 and secured by means commonly known in the art. In the illustrated embodiment, the two opposing halves 502 and 504 are joined by a plurality of snap-fit mechanisms 519 and opposing lugholes 518 through which bolts, screws, pins, and the like, can be engaged. A gasket (not shown) can be disposed between the two halves 502 and 504 to provide a seal. Though two halves can provide for ease of manufacturing, the present disclosure envisions a unitary construction of the particulate accelerator 500. Further, the particulate accelerator 500 can be made of steel, but the disclosure contemplates other materials such as aluminum, polymers, composites, ceramics, and the like.

Extending outwardly from each opposing half 502 and 504 of the particulate accelerator 500 can be cylindrical flanges 522. One of the two cylindrical flanges 522 can removably interface with a ringed gasket 520. In particular, the ringed gasket 520 can include two generally coaxial surfaces sized and shaped to create a frictional fit with the cylindrical flanges 522. The ringed gasket 520 can also be adapted to receive a short auger tube 314 or a long auger tube 316, discussed in detail below. The ringed gaskets 520 can provide a seal between the plurality of short and long auger tubes 314 and 316 and the particulate accelerators 500. The ringed gaskets 520 can maintain the seal while permitting relative movement of the short auger tubes 314 and/or long auger tubes 316 within the particulate accelerator 500 due to movement of the system as the particulate container 200 are emptied, experience vibration, and the like. The present disclosure contemplates the short auger tubes 314 and the long auger tubes 316 can be connected to the cylindrical flanges 522 through other means commonly known in the art, including but not limited to, pinning, clamping, fastening, adhesion, and the like. The opposing cylindrical flange 522 can interface with a cap 521. The cap 521 can create a frictional fit with the cylindrical flange 522 or can be secured by means commonly known in the art, including but not limited to, pinning, welding, fastening, clamping, and the like.

Each of the plurality of particulate accelerators 500 can connect to each of the plurality of outlet pipes 450 of the plenum 410 via holes 507. The connection can be through a screw or any other means so as not to significantly impede the airflow through the particulate accelerator 500.

Figure 16:
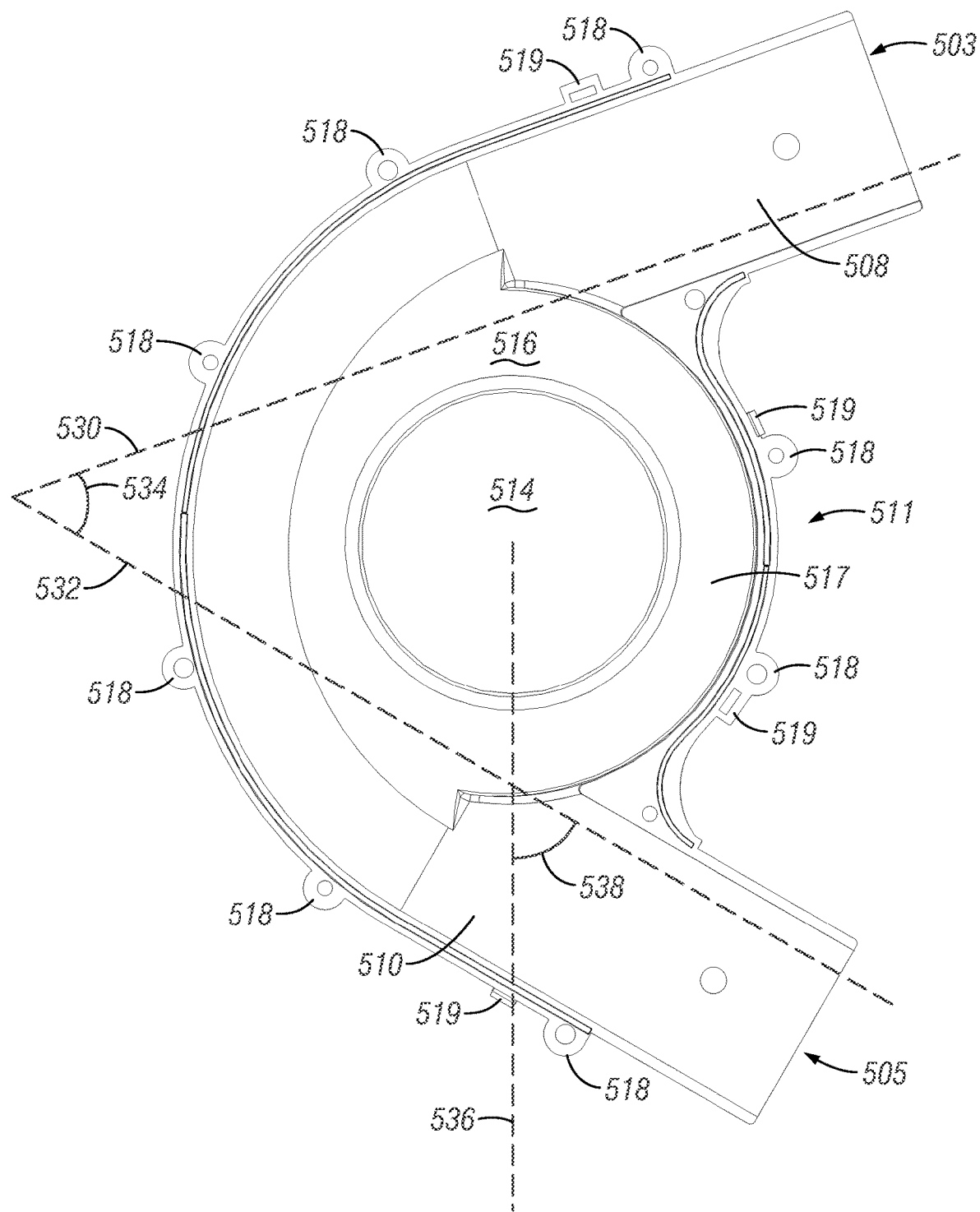
FIG. 16 is a cross section view of the particulate accelerator of FIG. 15B taken along section line 16-16.

Referring to FIGS. 15A, 15B and 16, an inlet tube 508 and outlet tube 510 can extend outwardly from a generally cylindrical main body 511. The particulate accelerator 500 can include a baffle 522 disposed proximate the inlet 503. The baffle 522 can restrict the flow of air through inlet tube 508 to impart the desired airflow characteristics in the particulate accelerator 500. The present disclosure contemplates the baffle 522 can be placed at any point within the flow of air to impart the desired airflow characteristics. The baffle 522 can be self-regulating, adjustable and/or controlled by any means commonly known in the art, including but not limited to, mechanical, electrical, electronic, pneumatic, and hydraulic controls.

The main body 511 can be integrally formed or removably connected to the inlet tube 508 and/or the outlet tube 510. The main body 511 can have curved back wall 512 comprising an arc from the inlet tube 508 to the outlet tube 510. Adjacent to the curved back wall 512 can be opposing side walls 516. The opposing side walls 516 can be parallel to one another and generally parallel to the direction of airflow through the particulate accelerator 500. The cylindrical flanges 522 discussed above can extend outwardly and perpendicularly from each of the opposing side walls 522. The cylindrical flange 522 can have a center opening 514 adapted to receive particulate from the particulate handling systems 300.

In operation, particulate from a short auger tube 314 and a long auger tube 316 can be forced by a screw conveyor 324 into the particulate accelerator 500 through the center openings 514, as best shown illustratively in FIGS. 5 and 15A. Upon reaching the particulate accelerator 500, the particulate mixture, consisting of a controlled ratio of a plurality of particulates, can descend vertically within the main body 511 due to the force of gravity.

After passing through the plenum 410, air generated by the blower 402 can enter an inlet 503 of a particulate accelerator 500 (FIG. 10). Due to the shape of the particulate accelerator 500, particularly the angle 534 between the inlet tube 508 and the outlet tube 510, the air can track in a flow pattern around the curved back wall 512. In an embodiment, the angle 534 between the major axis 530 of the inlet tube 508 and the major axis 532 of the outlet tube 510 can be acute. In another embodiment, the angle 534 can be between thirty and sixty degrees. The disclosure also contemplates the angle 534 can be at a right angle or obtuse angle based on the desire flow characteristics through the particulate accelerator 500.

While air is tracking in a flow pattern around the curved back wall 512, the air can mix with the blend of particulate descending vertically in the particulate accelerator 500, as discussed above, and can force at least a portion of the particulate mixture through the outlet 505. Any portion of the air-particulate mixture not ejected through the outlet 505 can track in a flow along the curved front wall 517 of the main body 511, after which the air-articulate mixture and air can rejoin subsequent airflow from the inlet 503 proximate to the inlet 508.

An acute angle 538 can exist between the major axis 532 of the outlet tube 510 and a vertical axis 536 bisecting the center opening 514 of the particulate accelerator 500. The acute angle 538 can result in a greater distance for the particulate to descend vertically prior to contacting a bottom portion of the curved back wall 512. The greater distance can provide increased time for the air, which can be tracking in a flow pattern around the curved back wall 512, to impart horizontal force on the particulate mixture. Due to the advantageous shape of the particulate accelerator 300, the configuration can create a fluid bed to suspend the particulate as the particulate exits the outlet 505 and into a discharge tube (not shown). The fluid bed and particulate suspension can reduce the effects of wall friction between the particulate and the discharge tube. In particular, the fluid bed and particulate suspension can counteract the gravitational force on particulate traveling in the generally horizontal discharge tube and can minimize interaction between the particulate and the bottom portion of a tube. The configuration can minimize increased backpressure due to wall friction and/or partial clogging. The fluid bed and particulate suspension can further eliminate complete clogging, resulting in improved particulate discharge and overall efficiency of the metering system. The process described above can occur simultaneously in each particulate accelerator 500 disposed along the length of the plenum 410, as best shown illustratively in FIG. 13.

The disclosure is not to be limited to the embodiments described herein. In particular, the disclosure contemplates numerous variations in the type of ways in which embodiments of the disclosure can be applied to particulate handling systems with variable application rate controls for particulate matter. The foregoing description has been presented for purposes of illustration and description. It is not intended to be an exhaustive list or limit any of the disclosure to the precise forms disclosed. It is contemplated other alternatives or exemplary aspects are considered included in the disclosure. The description is merely examples of embodiments, processes or methods of the disclosure. It is understood any other modifications, substitutions, and/or additions can be made, which are within the intended spirit and scope of the disclosure. For the foregoing, it can be seen the disclosure accomplishes at least all is intended.

The previous detailed description is of a small number of embodiments for implementing the disclosure and is not intended to be limiting in scope. The following claims set forth several the embodiments of the disclosure with greater particularity.

What is claimed is:

1. A particulate metering implement for variable application rate control, comprising:
- a frame assembly having a platform and frame members;
- a particulate container operably coupled to the frame assembly by the frame members, wherein the particulate container houses particulate matter;
- a particulate handling system operably coupled to a lower portion of the particulate container, wherein the particulate handling system controls dispensed particulate;
- a production handling system disposed below the particulate container and operably coupled to the particulate handling system, wherein the production handling system produces an airflow volumetric flow rate; and
- a particulate accelerator system operably coupled to the particulate handling system and the production handling system, wherein the particulate accelerator system combines the particulate matter and the volumetric airflow to distribute the particulate matter.

2. The particulate metering implement of claim 1, further comprising a gearbox within the particulate handling system operably coupled to a screw conveyor which moves particulate from the particulate container to the particulate accelerator system, wherein the gearbox can be selected to either engage or disengage the screw conveyor to start or stop particulate distribution to a selected row.

3. The particulate metering implement of claim 2, further comprising a main drive shaft operably coupled to a plurality of gearboxes.

4. The particulate metering implement of claim 3, further comprising an auger motor operably coupled to the main drive shaft, wherein the auger motor turns the main drive shaft coupled to the plurality of gearboxes, which in turn turns a plurality of screw conveyors.

5. The particulate metering implement of claim 4, wherein each of the plurality of gearboxes correlates directly to a row unit along the length of the particulate container.

6. The particulate metering implement of claim 5, further comprising a second main drive shaft operably coupled to an inverted gearbox.

7. The particulate metering implement of claim 6, wherein the first main drive shaft and the second main drive shaft can operate independently and/or at varied speeds.

8. A particulate metering implement for variable application rate control, comprising:
- a production handling system disposed below a particulate container and operably coupled to a particulate handling system, wherein the production handling system comprises an air flow origin;
- a particulate accelerator system operably coupled to the particulate handling system and the production handling system, wherein the particulate accelerator system combines a particulate matter and a volumetric airflow in a mixing area to distribute the particulate matter;
- an operated conveyance in operable communication with the particulate source and the mixing area;
- a variable-speed gearbox operatively coupled to the operated conveyance to produce a desired speed of the operated conveyance and the amount of particulate to the mixing area
- a confluence of the volumetric airflow and the particulate within the mixing area of the particulate accelerator; and
- a discharge associated with the air-particulate outlet of the particulate accelerator.

9. The particulate metering implement of claim 8, further comprising a variable speed motor operatively coupled to the operated conveyance in place of the gearbox to produce a desired speed of the operated conveyance.

10. The particulate metering implement of claim 8, wherein the application rate of the particulate can be adjusted on a row-by-row basis.

11. The particulate metering implement of claim 10, wherein one row can receive the particulate at a desired rate, while another row receives particulate at the same or another desired rate.

12. A particulate metering implement for variable application rate control, comprising:
- a particulate flow path comprising:
  - a. a particulate storage area;
  - b. a particulate accelerator having an air inlet, an air-particulate interface, an air-particulate output, and a mixing area;
  - c. an operated conveyance in operable communication with the particulate storage area, wherein the operated conveyance is enclosed by a housing having a housing wall with a circumference approximating the operated conveyance;
  - d. a discharge line connected to the air-particulate output of the particulate accelerator;
- wherein the operated conveyance conveys particulate from the particulate storage area to the particulate accelerator at a variable application rate,
- wherein the particulate descends vertically within the particulate accelerator into the mixing area,
- wherein the particulate mixes with and is suspended by air in the mixing area,
- wherein an air-particulate mixture moves through the air-particulate output into the discharge line.

13. The particulate metering implement of claim 12, wherein the particulate metering implement monitors particulate dispensed for each row in a field.

14. The particulate metering implement of claim 12, wherein the number of rotations of a shaft housed within the operated conveyance are measured to determine shaft speed.

15. The particulate metering implement of claim 14, wherein based on a number and known dimensions of flighting on the shaft, including diameter and helix angle, an estimation of how much particulate is dispensed per revolution can be obtained.

16. The particulate metering implement of claim 15, wherein the estimation can be applied to each unit row for the particulate metering implement, each of which can be operating at varied rates.

17. The particulate metering implement of claim 12, further comprising a frame assembly having a platform and frame members.

18. The particulate metering implement of claim 17, wherein the particulate storage area is coupled to the frame assembly by the frame members.

19. The particulate metering implement of claim 18, further comprising a particulate handling system operably coupled to a lower portion of the particulate storage area, wherein the particulate handling system controls dispensed particulate through the operated conveyance.

20. The particulate metering implement of claim 19, further comprising a production handling system disposed below the particulate storage area and operably coupled to the particulate handling system, wherein the production handling system produces airflow volumetric flow rate for the particle accelerator.

\* \* \* \* \*